(12) United States Patent
Okisu et al.

(10) Patent No.: US 6,535,250 B1
(45) Date of Patent: Mar. 18, 2003

(54) IMAGE PICKUP APPARATUS

(75) Inventors: Noriyuki Okisu, Osakasayama (JP); Keizou Ochi, Takatsuki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/096,252

(22) Filed: Jun. 11, 1998

(30) Foreign Application Priority Data

Jun. 12, 1997 (JP) ............................................. 9-155318

(51) Int. Cl.[7] .............................. H04N 3/08; H04N 9/47; H04N 1/04; G02B 26/10; G01V 8/00

(52) U.S. Cl. ...................... 348/345; 348/203; 348/98; 358/493; 250/334; 250/559.06

(58) Field of Search ................................. 348/324, 195, 348/203, 345, 96, 97, 98; 358/474, 488, 493, 505; 250/334, 559.06

(56) References Cited

U.S. PATENT DOCUMENTS

| | | | | |
|---|---|---|---|---|
| 5,144,122 A | * | 9/1992 | Danley et al. | 250/201.2 |
| 5,416,609 A | * | 5/1995 | Matsuda et al. | 358/474 |
| 5,808,756 A | * | 9/1998 | Matsuda | 358/474 |
| 5,834,762 A | * | 11/1998 | Matsuda et al. | 250/208.1 |
| 6,038,405 A | * | 3/2000 | Kageyama | 396/92 |
| 6,041,186 A | * | 3/2000 | Sensui | 396/80 |
| 6,181,379 B1 | * | 1/2001 | Kingetsu et al. | 348/497 |
| 6,233,014 B1 | * | 5/2001 | Ochi et al. | 348/324 |

FOREIGN PATENT DOCUMENTS

| | | |
|---|---|---|
| JP | 60-144074 | 7/1985 |
| JP | 7-71174 | 7/1995 |

* cited by examiner

*Primary Examiner*—Wendy R. Garber
*Assistant Examiner*—John M. Villecco
(74) *Attorney, Agent, or Firm*—Sidley Austin Brown & Wood LLP

(57) ABSTRACT

An electronic camera adopts an image pickup and optical system of a mirror scan type in which a mirror for scanning is disposed at a forward side of a taking lens. A line image sensor relatively scans an object while rotating the mirror to perform photographing. When controlling the exposure, the taking lens is moved synchronously along with rotation of the mirror to adjust the focal position thereof each time a slender sub-image of the object is picked up by the CCD. Driving the taking lens to focus the sub-image each time of scanning the sub-image enables picking up an entirety of the object image perfectly in a focused state.

19 Claims, 23 Drawing Sheets

IMAGE PICKUP APPARATUS

This application is based on patent application No. 9-155318 filed in Japan, the contents of which is hereby incorporated by reference.

BACKGROUND OF THE INVENTION

This invention relates to an image pickup apparatus, particularly to an electronic camera which can photograph a focused image of an object over its entirety by dividing a light image of the object into a plurality of sub-images and exposing each of the sub-images while focusing the same.

There have been known cameras in which a light image of an object is divided into a plurality of sub-images and these sub-images are successively exposed on a photosensitive member such as image sensor to photograph an entirety of the object image. In such a camera, a CCD line image sensor or a line image sensor comprising CCD (Charge Coupled Device) is disposed at a position different from an optical axis of a taking lens; a mirror for reflecting the light image onto a sensing surface of the line image sensor is disposed on the optical axis of the taking lens in such a manner that an angle of a reflected surface of the mirror with respect to the sensing surface of the CCD line image sensor is variable; and the light image of the object is scanned (sensed) by the CCD line image sensor by rotating the mirror and varying the reflected angle thereof, thereby photographing the entire image of the object. Hereinafter, a camera of this type is referred to as a "mirror scan type" camera.

FIG. 33 is a schematic construction diagram of an image pickup and optical system of a mirror scan type camera.

In FIG. 33, a board (object) 101 is disposed in parallel with a lens plane and in front of a taking lens 100 on an optical axis L. A mirror 102 is disposed rotatable at a rear position of the taking lens 100 on the optical axis L. A line image sensor 103 is arranged above the mirror 102.

The mirror 102 is rotatable about a rotational axis which perpendicularly intersects the optical axis L. A reflected surface of the mirror 102 opposes to the board 101 and the line image sensor 103. When an angle φ which is defined by the optical axis L and the mirror 102 is set at φ=φ1, φ2, φ3, points A, B, C on the board 101 are respectively projected on the sensing surface of the line image sensor 103.

In other words, when the mirror 102 is rotated from the position φ1 to φ3, the line image sensor 103 relatively scans the board 101 from the position A to the position C. Accordingly, as the line image sensor 103 picks up the image of the object 101 in synchronism with the rotation of the mirror 102 which rotates at a given speed, a slender image (sub-image) is successively scanned, and synthesizing these sub-images enables reading of the entire image of the board 101 from the position A to the position C.

The above image pickup system of mirror scan type has the following problem. Since a distance (length of optical path) from the taking lens 100 to the sensing surface of the line image sensor 103 is varied in accordance with the rotation of the mirror 102, the likelihood cannot be avoided that an unfocused sub-image is read during the scanning, resulting in picking up an unfocused image as a whole.

Photographing an image with its entirety in a focused state is in great need depending on the situation, particularly, in a case where giving information (such as characters and figures are drawn on a white board) is essential than showing a graphic image. Further, also in taking a landscape photo, there is a necessity of focusing an entire image, e.g., in the case where plural persons are arranged in a field with different object distances from one another.

In the above cases, there has been proposed a photographing method in which the depth of field is increased as much as possible by reducing the exposure amount as much as possible to obtain a seemingly focused photographed image. However, this photographing method has the limit on reliability in the following cases. For example, in the case where an entirety of a building is photographed from an oblique direction, an object distance distribution within a field greatly varies. Further, in photographing an object inside a room, an exposure light amount to the object is not sufficient. In either case, a desired exposure amount cannot be obtained owing to various factors such as the composition of the photographed image and the condition of photographing, resulting in an unfocused image as a whole.

SUMMARY OF THE INVENTION

It is an object of the present invention to provide an image pickup apparatus which has overcome the problems residing in the prior art.

It is another object of the present invention to provide an image pickup apparatus which can pick up a focused object image over its entirety with a simplified construction.

According to an aspect of the invention, an image pickup apparatus comprises: a photosensitive member; a light image introducer which introduces respective light images of divided parts of an object part-by-part onto the photosensitive member, the light image introducer including a taking lens; a distance information generator which generates distance information for each divided part of the object, the distance information generator including a distance detector which detects a distance to the object; and a lens driver which drives the taking lens based on generated distance information.

According to another aspect of the invention, an image pickup apparatus comprises: an image sensor; a light image introducer which introduces respective light images of divided parts of an object part-by-part onto the image sensor, the light image introducer including a taking lens; a distance information generator which generates distance information for each divided part of the object, the distance information generator including a distance detector which detects a distance to the object; a lens driver which drives the taking lens based on generated distance information; and an image corrector which corrects output of the image sensor to eliminate an image distortion caused by an oblique image pickup.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 6A and 6B are diagrams showing an oblique photography correction, wherein FIG. 6A shows an obliquely photographed image and FIG. 6B shows an image after the oblique photography correction;

DETAILED DESCRIPTION OF THE PREFERRED EMBODIMENTS OF THE INVENTION

Figure 1:
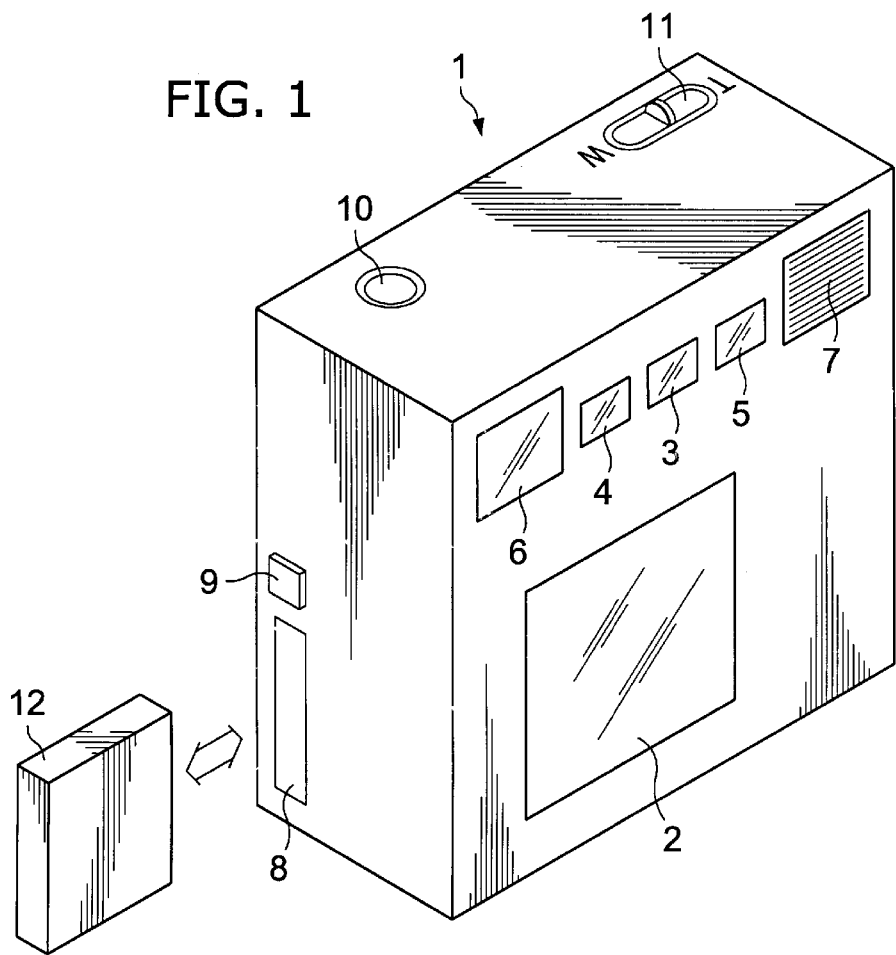
FIG. 1 is a perspective view showing an external configuration of a first electronic camera embodying the present invention.
Figure 2:
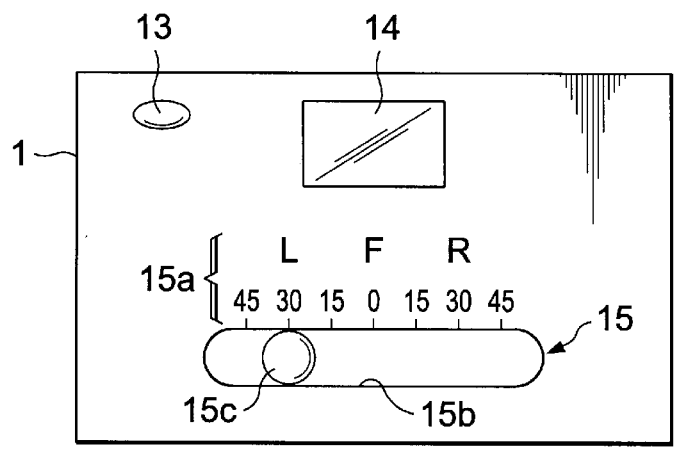
FIG. 2 is a rear view of the first electronic camera.
Figure 3:
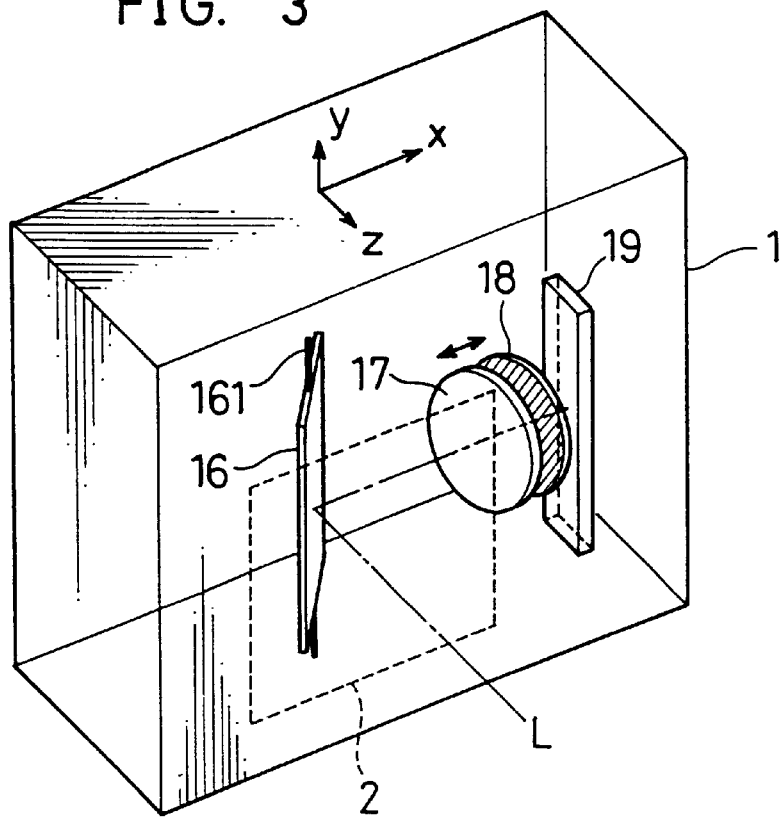
FIG. 3 is a schematic construction diagram of an image pickup and optical system of a mirror scan type provided in the first electronic camera.

FIG. 1 is a perspective view showing an external configuration of a first electronic camera embodying the invention. FIG. 2 is a rear view of the first electronic camera. FIG. 3 is a schematic diagram of an image pickup and optical system incorporated in the first electronic camera.

Figure 4:
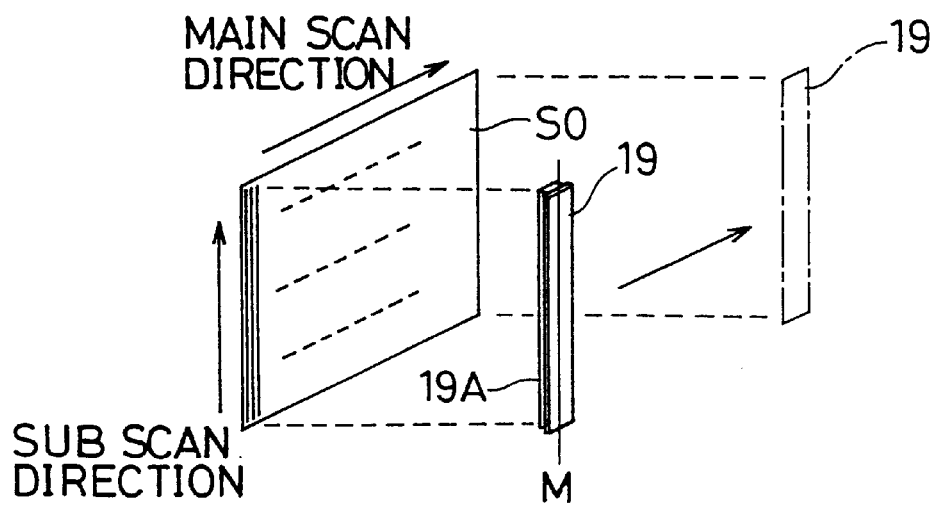
FIG. 4 is a perspective view showing an arranged position and a scan direction of an image pickup device (line image sensor) relative to a light image of an object in the mirror scan type image pickup and optical system.

An electronic camera 1 of FIG. 1 has an image pickup system of a mirror scan type comprising a mirror and a CCD line image sensor. In this image pickup system, the mirror is rotated to allow the CCD line image sensor to scan an image of an object in a main scan direction of a field image (transverse direction in FIG. 4, the field image has a longer side in the transverse direction) to generate image data of the object and that the generated image data is recorded in an unillustrated hard disk card of PCMCIA standards.

The camera 1 is provided with a function of correcting an image of an object whose surface is not in a plane parallel with the sensing surface (or exposing surface) of the CCD line image sensor (hereinafter, "oblique image") into an image of an object whose surface is on a plane parallel with the sensing surface of the CCD line image sensor (hereinafter, "front image"). Hereinafter, the above correction is referred to as an oblique photography correction.

Figure 5:
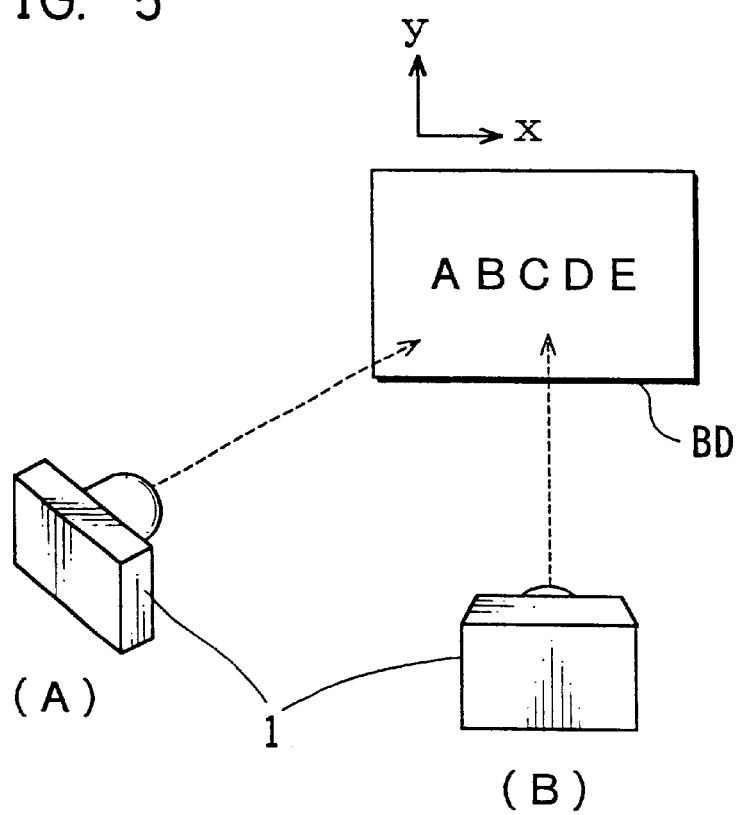
FIG. 5 is a diagram showing an oblique photographing of an object.
Figures 6A, 6B:
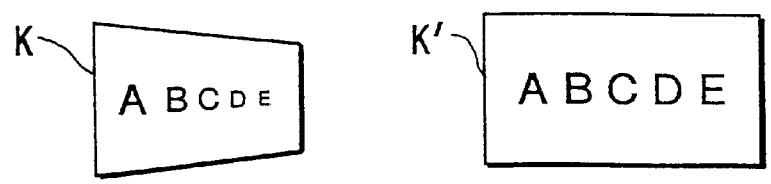

More specifically, in the case that characters, figures and the like drawn on a white board BD are photographed in a normal photographing mode in a position (A) obliquely forward of the white board BD to the left as shown in FIG. 5, the photographed image is an oblique image K in which a dimension at the right end is smaller than that at the left end as shown in FIG. 6A resulting from a different object distance distribution within a field. In the case that such an object is photographed in an oblique photography correction mode to be described later, the oblique image K is corrected into a front image K' as shown in FIG. 6B which could be obtained by photographing the object in a position (B) substantially in front of the white board BD.

Here, the principle of oblique photography correction is briefly described. It should be noted that the description is of a linear image in order to simplify the description.

Figure 7:
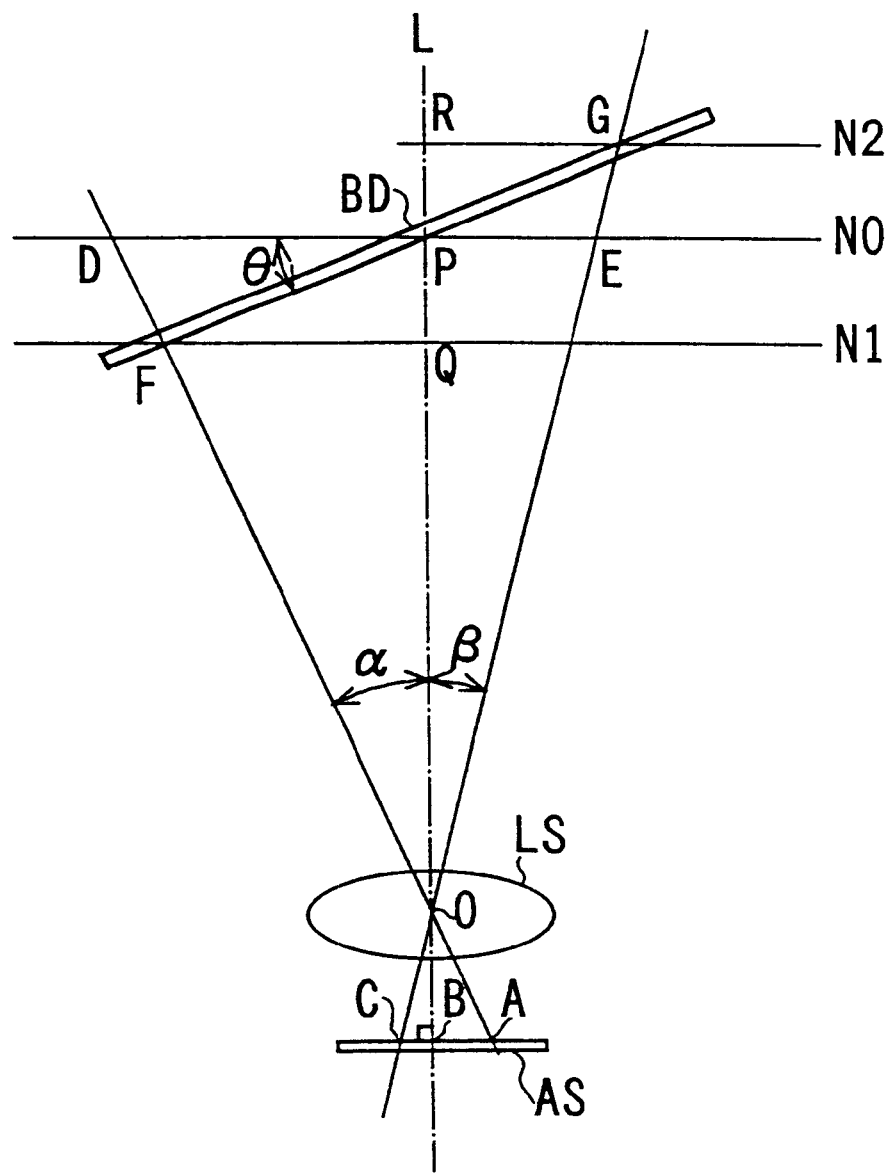
FIG. 7 is a diagram of the image pickup system viewed from right above during oblique photographing.

FIG. 7 is a diagram of the image pickup system viewed from right above during oblique photographing, wherein the display surface of the white board BD (hereinafter, "object surface") is inclined by an angle θ (hereinafter, inclination angle θ) with respect to the sensing surface of the image pickup element (or area sensor) AS.

In FIG. 7, identified by L is an optical axis of a taking lens LS, and by N0, N1, N2 are line segments parallel to the sensing surface of the area sensor AS which pass points P, F, G on the white board BD, respectively. Points O, Q, R, D and E are an intersection of a lens surface of the taking lens LS and the optical axis L; an intersection of the line segment N1 and the optical axis L; an intersection of the line segment N2 and the optical axis L; an intersection of the line segment N0 and the extension of a line segment BF; and an intersection of the line segment NO and a line segment CE.

A light image of the line segment FG on the white board BD is formed between points A and C of the sensing surface of the area sensor AS. However, since the sensing surface and the object surface are inclined to each other by inclination angle θ, the light image AC formed on the sensing surface of the area sensor AS is equivalent to projection of an image between points D and E on the sensing surface of the area sensor AS.

Assuming that, at the respective points A, B, C on the sensing surface of the area sensor AS, photographing magnifications are m1, m0, m2 and object distances are D0(=OP), D1(=OQ), D2(=OR), $m1=m0 \cdot OP/OQ = m0 \cdot D0/D1$, $m2 = m0 \cdot OP/OR = m0 \cdot D0/D2$. Accordingly, $m2>m0>m1$. The light image formed on the sensing surface is an oblique image K as shown in FIG. 6A, and only point B (intersection of the optical axis L and the sensing surface) is perfectly in focus among the light image AC.

The oblique photography correction is performed by obtaining a photographing magnification mi (i=3, 4, . . . n) of the respective points between points A and B on the sensing surface of the area sensor AS and a photographing magnification mi' (i'=3, 4, . . . n) of the respective points between points B and C on the sensing surface of the area sensor AS, enlarging or reducing the picked image of the light image AC based on the photographing magnifications mi, mi'.

If Di' is an object distance at an arbitrary point between the points B and A on the sensing surface of the area sensor AS and αi is a view angle at that point (an angle between a line segment passing that point and the point O and the optical axis L), $D0/Di'=1+\tan(\alpha i) \cdot \tan(\theta)$. Accordingly, the photographing magnification mi' at this arbitrary point can be calculated based on the inclination angle θ, the photographing magnification m0 and the view angle αi in accordance with Equation (1):

$$mi'=m0 \cdot D0/Di'=m0 \cdot \{1+\tan(\alpha i) \cdot \tan(\theta)\} \qquad (1)$$

In accordance with Equation (1), the photographing magnification m0 can be calculated as: $m0=a \cdot f/D0$ (where a: proportion coefficient, f: focal length). Further, the equation: $D0/Di'=1+\tan(\alpha i) \cdot \tan(\theta)$ can be understood as the following Equation (2), using the object distance D1 and the view angle α with respect to the point A in FIG. 7:

$$OQ=OP-PQ=OP-OQ \cdot \tan(\alpha) \cdot \tan(\theta)$$

$$(PQ=FQ \cdot \tan(\theta), FQ=OQ \cdot \tan(\alpha))$$

$$\therefore OP=OQ \cdot \{1+\tan(\alpha) \cdot \tan(\theta)\}$$

$$\therefore D0/D1=1+\tan(\alpha) \cdot \tan(\theta) \qquad (2)$$

Hence, in a position of the arbitrary view angle αi:

$$D0/Di'=1+\tan(\alpha i) \cdot \tan(\theta).$$

If Di is an object distance at an arbitrary point between the points B and C on the sensing surface of the area sensor AS and βi is an view angle at that point, $D0/Di=1-\tan(\beta i) \cdot \tan(\theta)$. Accordingly, the photographing magnification mi at this arbitrary point can be calculated based on the inclination angle θ, the photographing magnification m0 and the view angle βi in accordance with Equation (3):

$$mi=m0 \cdot D0/Di=m0 \cdot \{1-\tan(\beta i) \cdot \tan(\theta)\} \qquad (3)$$

The equation: $D0/Di=1-\tan(\beta i) \cdot \tan(\theta)$ can be understood similarly as described above.

Referring back to FIG. 1, the camera 1 is provided with a photographing window 2 provided substantially in the center of its front surface, measuring windows 4 and 5 provided above the photographing window 2 for measurement of an object distance by an active metering method.

The photographing window 2 is a window for introducing a light image of an object to the image pickup and optical system of mirror scan type, which is provided in the first electronic camera 1. The image pickup and optical system comprises, as shown in FIG. 3, a mirror 16, a taking lens 17, a diaphragm 18, and a solid state image sensor 19. These parts are arranged in a transverse direction of the electronic camera 1 in this order (in the x-arrow direction of FIG. 3).

The mirror 16 reflects a light image of an object thereon and guides the reflected image onto a sensing surface or a sensing surface of the solid state image sensor 19. The mirror 16 is arranged on a rear side of the photographing window 2. The mirror 16 is supported rotatable about a rod 161 extending in the y-axis direction and rotated by an unillustrated electric motor to vary the reflected surface thereof relative to an object.

The solid state image sensor 19 including a CCD line image sensor is adapted for photoelectrically converting a light image of an object to an electric image. The solid state image sensor 19 (hereinafter, "CCD 19") is a color line image sensor capable of sensing a color image in three primary colors which comprises, e.g., three CCD line image sensors arrayed in a line in parallel with one another. The respective color filters of Red (R), Green (G), and Blue (B) are provided on sensing surfaces of the CCD line image sensors. The CCD 19 picks up a light image of an object by converting the light image into an electric image of the respective color components of R, G, and B.

The taking lens 17 comprises a zoom lens which includes a plurality of focusing lenses (focusing lens group) arranged, e.g., in a forward portion thereof, and moving the focusing lens group adjusts focus of the taking lens 17. It should be appreciated that in FIG. 3, the taking lens 17 is indicated by a convex lens which is equivalent to the zoom lens. The diaphragm 18 adjusts a light amount incident upon the CCD 19 via the mirror 16.

The image pickup and optical system of mirror scan type in FIG. 3 is operated in such a manner that a sensing surface 19A of the CCD 19 relatively scans an object surface SO in a main scan direction (transverse direction in FIG. 4) and the CCD 19 is driven in synchronism with the relative scanning to perform photographing.

According to the mirror scan method, when a focal position of the taking lens 17 is fixed, the relative scanning of the CCD 19 is impossible in the state that the object surface SO and the sensing surface 19A are in parallel to each other. In other words, the sensing track of the sensing surface 19A curves, and accordingly, an entirety of a photographed image is defocused.

To eliminate this problem, in the first electronic camera 1, the taking lens 17 is moved in a certain direction along an optical axis L in association with rotation of the mirror 16 (i.e., scanning of the CCD 19) to focus a sub-image each scanning of the CCD 19, thereby photographing an entirety of the object image in a focused state.

Referring back to FIG. 1, the window 4 is a light projecting window through which infrared rays are projected toward an object, and the window 5 is a light receiving window through which the infrared rays reflected by the object are received. Although the active metering method is adopted in this embodiment, a passive metering method may be adopted.

A light meter window 3 is provided between the windows 4 and 5 for measurement of the brightness of an object. On the left side of the light projecting window 4 is provided an objective window 6 of a viewfinder. On the right side of the light receiving window 5 is provided a flash 7.

In one side surface of the camera 1, there are provided a card insertion slot 8 through which a hard disk card 12 is mounted and ejected, and a card ejection button 9 above the card insertion slot 8 for ejecting the mounted hard disk card 12. When the photographed contents are to be printed out, the hard disk card 12 is taken out of the camera 1 by pressing the card ejection button 9, and is mounted in a printer capable of loading this hard disk card 12 to print the photographed contents out.

The camera 1 may be provided with an interface of an SCSI cable. Then, the camera 1 and the printer can directly be connected via the SCSI cable, and image data are transferred from the camera 1 to the printer to print the photographed images out.

Although a hard disk card 12 of PCMCIA standards is adopted as a storage medium for the image data in this embodiment, a memory card, a mini-disk (MD) or any other storage medium may be used provided that it is capable of storing the photographed contents as image data.

A shutter release button 10 is provided at a left end on the upper surface of the camera 1 (see FIG. 1), and a zoom switch 11 is provided at a right end thereof. The shutter release button 10 is partly pressed to turn on a switch S1 for photographing preparation including a focal length adjustment and setting of an exposure control value. When the shutter release button 10 is fully pressed, a switch S2 is turned on for designating an exposure.

The zoom switch 11 is a three-contact switch slidable along transverse directions of FIG. 1. The zooming ratio of the taking lens 17 can be continuously changed to a telephoto side when the zoom switch 11 is slid toward T (TELE)-side, while being changed to a wide-angle side when the zoom switch 11 is slid toward W (WIDE)-side.

As shown in FIG. 2, in the back surface of the camera 1, a main switch 13 and an eyepiece window 14 of the viewfinder are provided at a left end portion and a substantially middle portion of its upper side, and a mode setting switch 15 is provided below the eyepiece window 14.

The mode setting switch 15 has a function of switchingly setting a normal photographing mode and an oblique photography correction mode in which oblique photography correction is applied to an oblique image and setting an inclination angle θ (see FIG. 7). The inclination angle θ is an angle defined by the object surface SO and the sensing surface of the camera 1. For example, when the sensing surface of the camera 1 is set in parallel with the back surface of a main body of the camera 1, the inclination angle θ corresponds to an angle defined by a surface of a white board BD (object surface) and the back surface of the camera 1.

The mode setting switch 15 includes a transversely long guide groove 15b having an angle scale 15a on its upper portion, and an operation button 15c movable along the guide groove 15b. The inclination angle θ can be set by setting the operation button 15c in a specified angle position of the angle scale 15a.

In the angle scale 15a, 0° is arranged in the middle, and 15°, 30° and 45° are arranged on each of the opposite sides of 0° so that three different inclination angles θ can be set on the left and right sides. Here, the angles on the left side are inclination angles in the case that an object is photographed from the left side, whereas the angles on the right side are inclination angles in the case that an object is photographed from the right side. If the operation button 15c is set in the middle position, the inclination angle is 0°. Accordingly, the normal photographing mode is set in which the oblique photography correction is not applied to the photographed image.

Although the inclination angle θ that the camera operator measures by the eye can discretely be set in this embodiment, it may continuously be set according to a slide amount of the operation button 15c. Alternatively, the numerical value of the inclination angle θ may be directly inputted.

Figure 8:
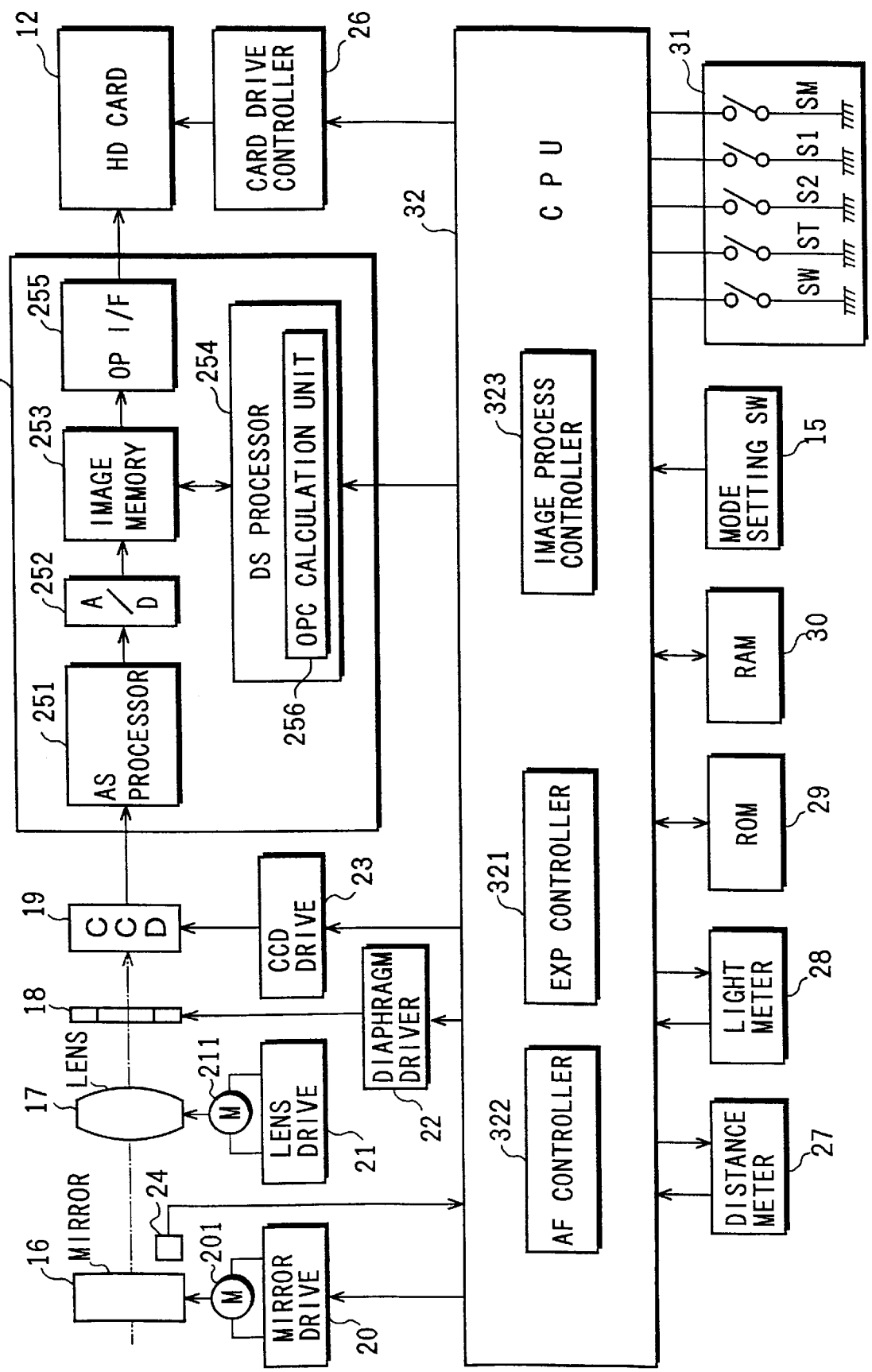
FIG. 8 is a block diagram showing an arrangement of the first electronic camera.

FIG. 8 is a block diagram showing a construction diagram of the first electronic camera 1. In FIG. 8, the same elements as those described above are indicated as the same reference numerals.

A mirror drive controller 20 controls an electric motor 201 which is a drive source for the mirror 16 to rotate the mirror 16. The mirror drive controller 20 starts rotating the mirror 16 upon receiving a shutter release signal from a control unit 32, i.e., rotates the mirror 16 at a certain angular velocity to set the mirror 16 at a specified position.

The rotated position of the mirror 16 is detected by a position sensor 24 including a photosensor. The mirror drive controller 20 returns the mirror 16 to a home position (scan start position) upon receiving a detection signal from the position sensor 24 indicative of a completion of the rotation of the mirror 16.

A lens drive controller 21 controls the focusing lens group of the taking lens 17. The focusing lens group is provided in a forefront of the taking lens 17 to be movable in fore and aft directions along the optical axis L, and is moved by a driving force of an electric motor 211. The lens drive controller 21 controls the electric motor 211 to automatically adjust the focusing of the taking lens 17.

A drive transmitter (not shown) is provided at a lower portion of the taking lens 17 for converting the driving force of the electric motor 211 into fore and aft movements of the focusing lens group along the optical axis L to transmit the driving force of the electric motor 211 to the focusing lens group of the taking lens 17. The drive transmitter has a position detecting element for detecting a position of the focusing lens group. A detection signal of the position detecting element is inputted to the control unit 32.

The control unit 32 detects the position of the focusing lens group based on the detection signal, generates a drive control signal indicative of controlling the electric motor 211 to adjust a focus position of the taking lens 17 in association with rotation of the mirror 16, and outputs the drive control signal to the lens drive controller 21.

A diaphragm drive controller 22 controls an opened amount of the diaphragm 18. Specifically, the diaphragm drive controller 22 controls the opened amount of the diaphragm 18 based on an exposure control value inputted from the control unit 32 which centrally controls photographing of the camera 1.

A CCD drive controller 23 controls the image pickup operation of the CCD 19. The CCD drive controller 23 controls the CCD 19 to pick up an image (electric charge storing operation and output of the stored electric charge) at a certain cycle in synchronism with rotation of the mirror 16.

A drive control of the mirror 16 and the taking lens 17 in an exposure control according to the mirror scan method is briefly described.

Figure 9:
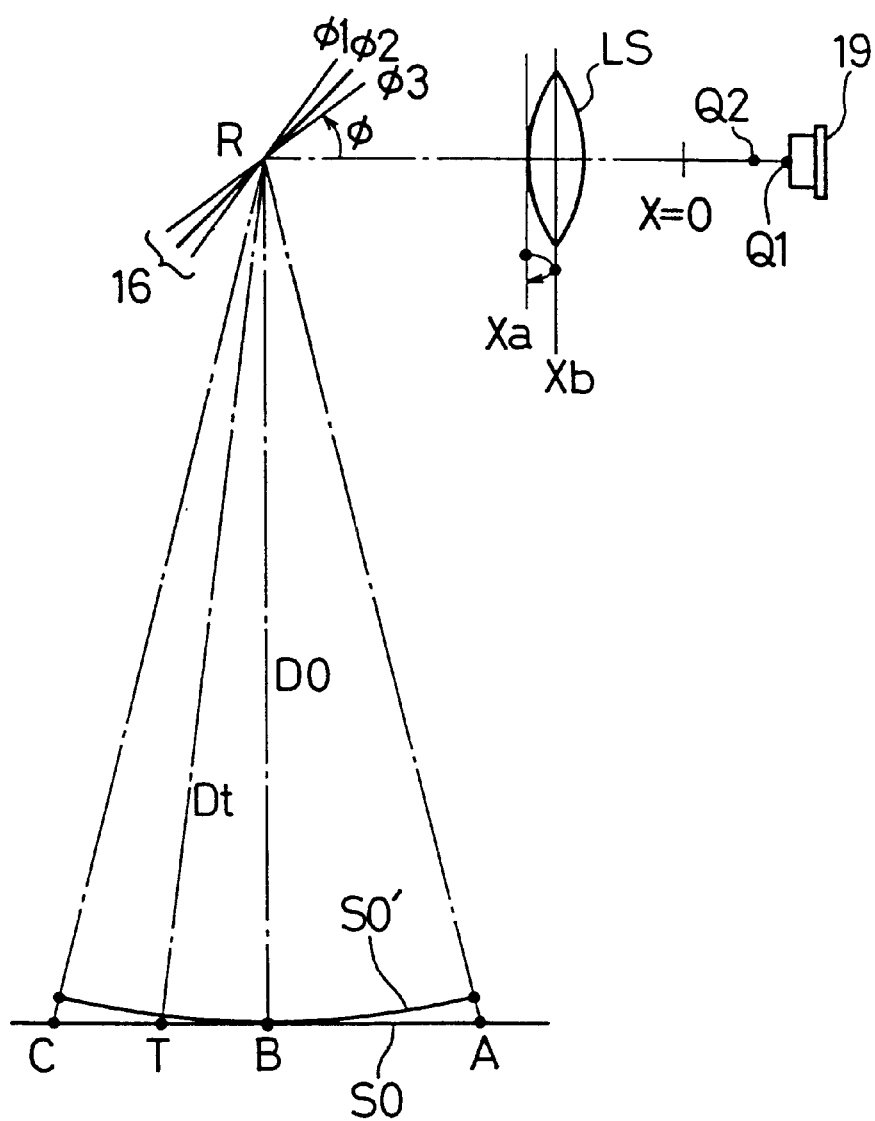
FIG. 9 is a diagram of the image pickup and optical system of mirror scan type viewed from right above.

FIG. 9 is a diagram showing the mirror scan type image pickup and optical system viewed from right above (in the y-axis direction of FIG. 3). FIG. 9 shows a state that a focus position of a lens LS is adjusted such that a light image of point A is picked up on the sensing surface 19A of the CCD 19.

In FIG. 9, the lens LS corresponds to a convex lens equivalent to the taking lens 17. An object surface SO corresponds to the display surface of the white board BD in FIG. 5. When the angle of the reflected surface of the mirror 16 with respect to the optical axis L is set at φ, light images of points A, B, C on the object surface SO are reflected on the sensing surface 19A of the CCD 19 when the mirror is rotated at the respective angles of φ1, φ2, φ3.

When the mirror 16 is rotated from the angle φ1 to the angle φ3 in a state that the focus position of the lens LS is retained at the state of FIG. 9, an object surface which is picked up on the sensing surface 19A of the CCD 19 is shaped into a curved surface SO' because of the following reason. Taking an arbitrary point T which is a point other than the point B on the object surface SO, a length of optical path Dt from a reflected point R of the mirror 16 to the point T on the object surface SO is longer than a length of optical path DO from the reflected point R to the point B. Accordingly, a light image of the point T is focused at a position Q2, which is forward of a sensing position Q1 on the sensing surface 19A of the CCD 19 by a certain length.

Accordingly, when the mirror 16 is rotated from angle φ1 to angle φ3 to scan the object surface SO from the point A to the point C, the focus position of the point T which is on the way between the points A and C reciprocates between the points Q2 and Q1. This means that when judging a focal state of the light images of the points A to C on the sensing surface 19A of the CCD 19, only the light image of the point B is perfectly in focus on the CCD 19, whereas all the light images other than the light image at the point B are more or less defocused on the CCD 19, i.e., focused at a position forward of the sensing surface 19A of the CCD 19.

To eliminate the above phenomenon, in the image pickup and optical system of mirror scan type of this embodiment, the lens LS is moved in synchronism with rotation of the mirror 16 from the angle φ1 to the angle φ3 to focus all the light images from the points A to C on the position Q1 on the sensing surface 19A of the CCD 19.

Figure 10:
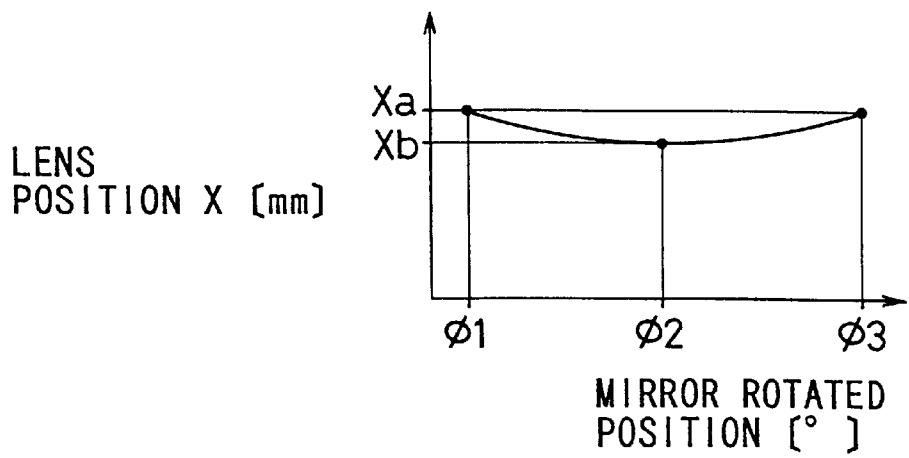
FIG. 10 is a diagram showing a lens drive characteristic of mirror scan type optical system when an object surface is not inclined.

More specifically, a position X of the lens LS is set such that a focus position of the lens LS for an infinite distance on the optical axis L (position closest to the CCD 19) is set at a reference position (X=0). The moved amount of the lens LS X (>0) from the reference position is set as follows. When a focus position of the lens LS in scanning the point A (or point C) is set at Xa, and a focus position in scanning the point B is set at Xb, Xa>Xb. In this arrangement, as shown in FIG. 10, the lens LS is moved in such a manner that when the lens LS is moved between the positions Xa and Xb in synchronism with rotation of the mirror 16 from the angle φ1 to the angle φ3, the light images from the points A to C are focused on the sensing surface 19A of the CCD 19.

In this description, it should be noted that for easier explanation, the position adjustment of the lens LS is described assuming that the convex lens LS has a focal distance equivalent to the taking lens 17 and focussing is performed by moving the entirety of the taking lens 17. Accordingly, a specific movement of the focusing lens group of the taking lens is not described.

Various lens focusing methods such as an entire focusing method (entirety of the lens group is moved), a fore-element focusing method (forward part of the lens group is moved), and a middle-element focusing method (middle part of the lens group is moved) may be adopted according to the arrangement of the taking lens 17. In any case, moving (feeding) the taking lens 17 in such a direction as to set the focus position of each of sub-images of an object on the sensing surface 19A of the CCD 19 enables focusing of the entirety of a light image of the object which is obtained by synthesizing the sub-images.

Since the distance from the reflected point R of the mirror 16 to the sensing position Q1 on the CCD 19 is fixed, the position X of the lens LS when the mirror 16 is set at the angle 0 can be calculated by detecting a distance from the reflected point R to a sensing point of the object.

Figure 11:
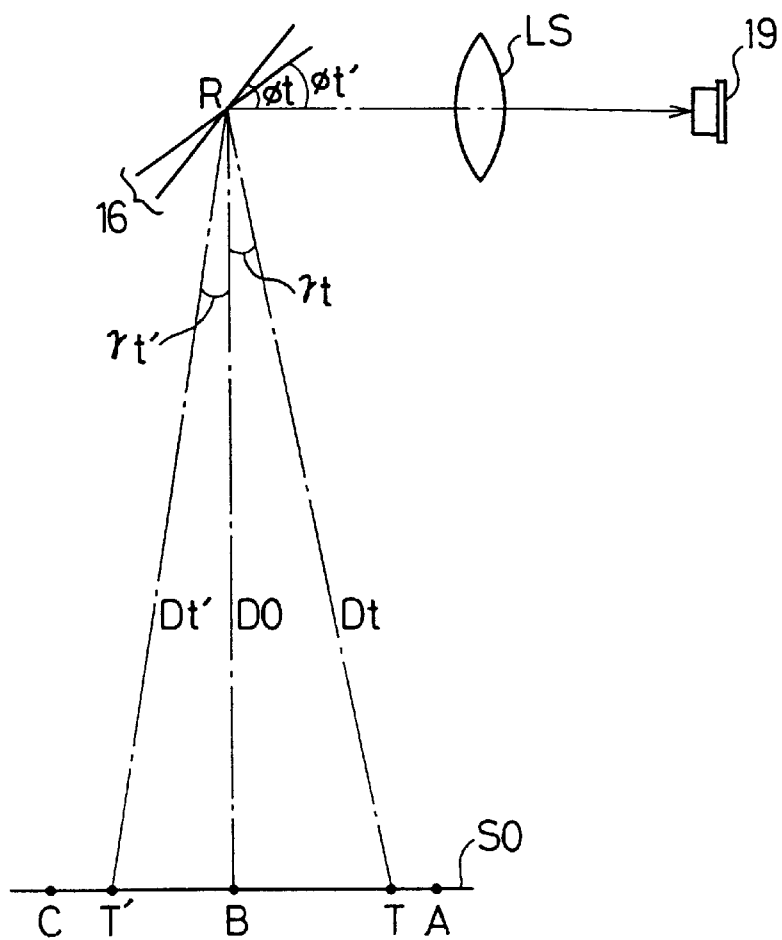
FIG. 11 is a diagram showing a relationship between an rotation angle φ of a mirror and a deflection angle γ at a sensing point on the object with respect to a front direction.

More specifically, in FIG. 11, if φt is an angle of the mirror 16 in sensing the arbitrary point T between the points A and C on the object surface SO, ∠TRB is γt, Dt is a distance from the reflected point R to the point T, φt' is an angle of the mirror 16 in scanning an arbitrary point T' between the points B and C on the object surface SO, ∠T'RB is γt', and Dt' is a distance from the reflected point R to the point T', $$\gamma t = 90 - 2\phi t$$

$$\gamma t' = 2\phi t' - 90$$

Accordingly, the distances Dt, Dt' are expressed by the following Equations (4), (5), respectively:

$$Dt = RB/\cos(\gamma t) = RB/\cos(90 - 2\phi t) = RB/\sin(2\phi t) \quad (4)$$

$$Dt' = RB/\cos(\gamma t') = RB/\cos(2\phi t' - 90) = RB/\sin(2\phi t') \quad (5)$$

A distance RB (object distance) is detected by a distance meter device 27. The angles φt, φt' are detected by the position sensor 24. Accordingly, the distances Dt, Dt' are respectively calculated in accordance with Equations (4) and (5) based on the detection results by the distance meter device 27 and the position sensor 24.

If Lrt is a distance from the sensing position Q1 of the CCD 19 to the lens LS when the light image of the point T is scanned, Lrb is a distance from the sensing position Q1 of the CCD 19 to the lens LS when the light image of the point B is scanned, Lq is a distance from the reflected point R of the mirror 16 to the sensing position Q1 of the CCD 19, and f is a focal distance of the lens LS, then, the distance Lrt is calculated in accordance with Equation (4) and the following Equations (6) and (7). Similarly, a distance Lrt' from the sensing position Q1 of the CCD 19 to the lens LS when the light image of the point T' is scanned is calculated using Equations (5), (6), and (7).

$$1/\{Dt + (Lq - Lrb)\} + 1/Lrb = 1/f \quad (6)$$

$$1/\{Dt + (Lq - Lrt)\} + 1/Lrt = 1/f \quad (7)$$

Since the distance from the sensing position Q1 of the CCD 19 to the reference position of the lens LS is known, the position X of the lens LS when the mirror 16 is rotated at the angle φ can be calculated using the above distances Lrt, Lrt'.

Figure 12:
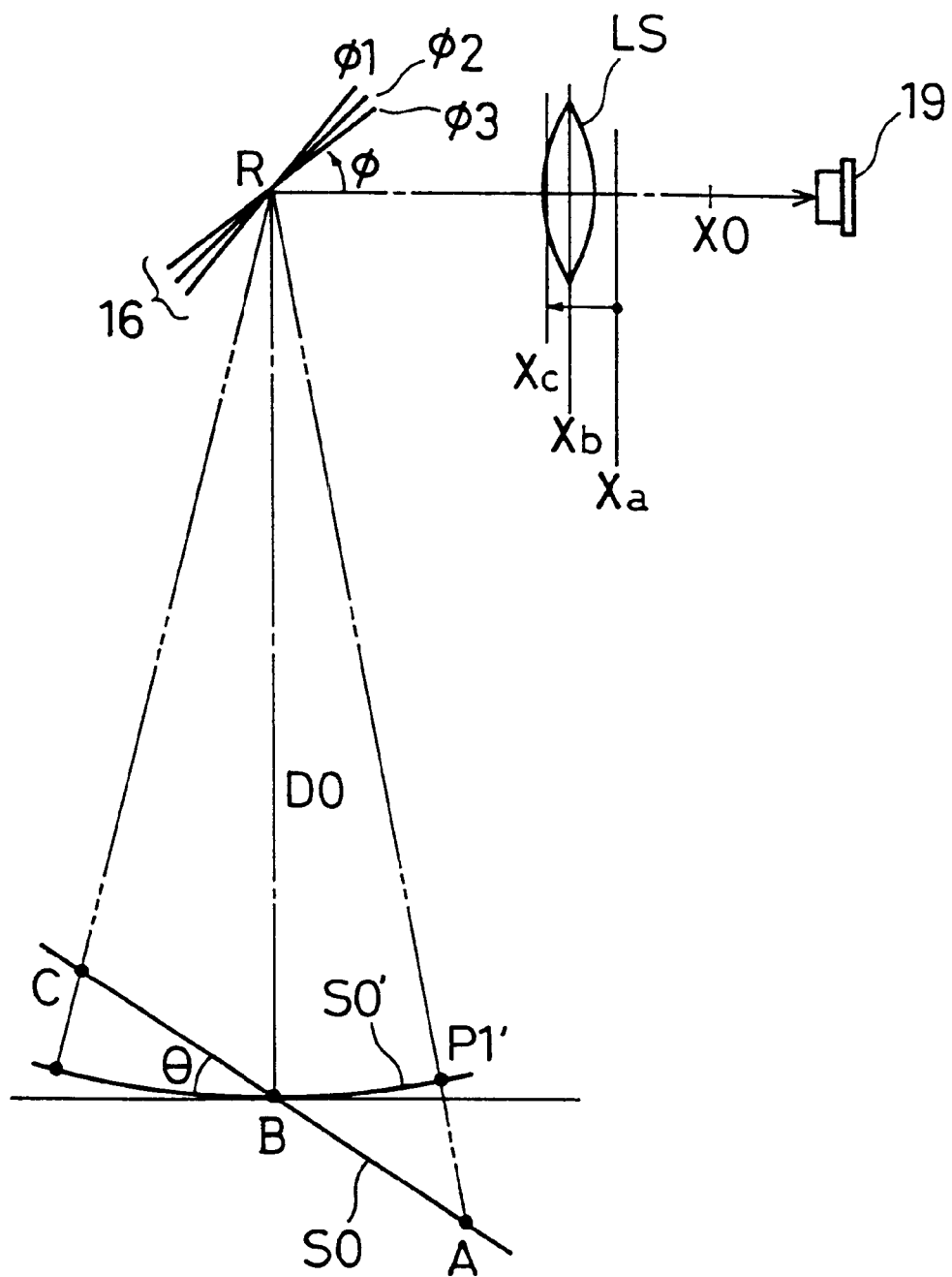
FIG. 12 is a diagram showing the mirror scan type image pickup and optical system when the object surface is inclined.

FIG. 12 is a diagram showing the mirror scan type image pickup and optical system from right above (in the y-axis direction of FIG. 3) when the object surface SO is inclined. FIG. 12 shows the state where the object surface SO of FIG. 9 is inclined at the inclination angle θ. In FIG. 9, the object surface SO is not inclined. Accordingly, portions on the object surface SO other than the point B in FIG. 9 are focused at a position forward of the sensing surface 19A on the CCD 19. In FIG. 12, since the object surface SO is inclined, portions between the points A and B are farther away from the mirror 16, whereas portions between the points B and C come closer to the mirror 16, compared to FIG. 9. Accordingly, in FIG. 12, the portions between the points A and B are focused at a position rearward of the sensing surface 19A of the CCD 19, whereas the portions between the points B and C are focused at a position further forward of the sensing surface 19A, compared to FIG. 9.

Figure 13:
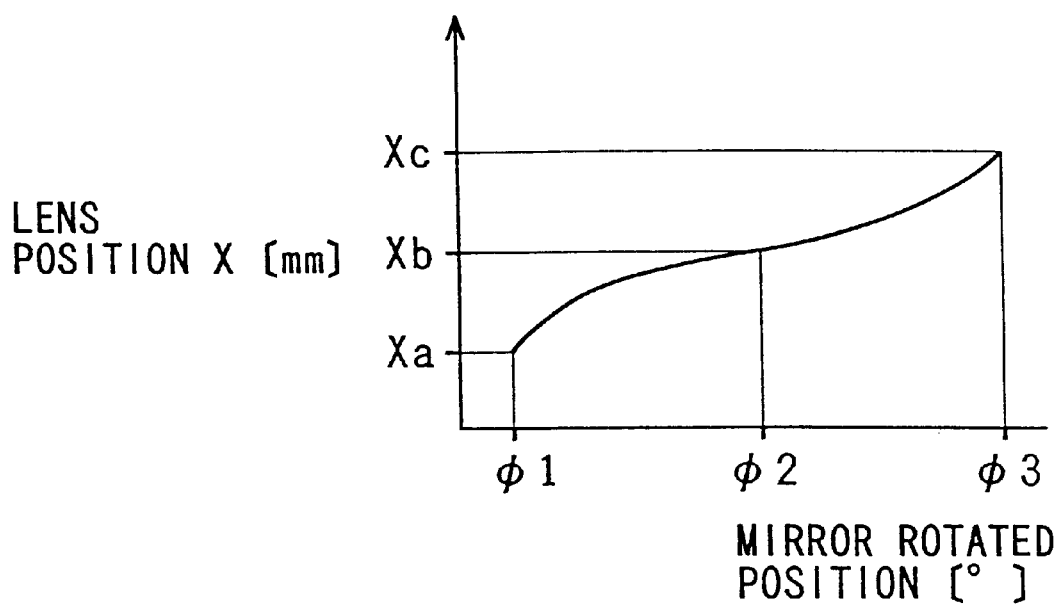
FIG. 13 is a diagram showing a lens drive characteristic of mirror scan type optical system when the object surface is inclined.
Figure 14:
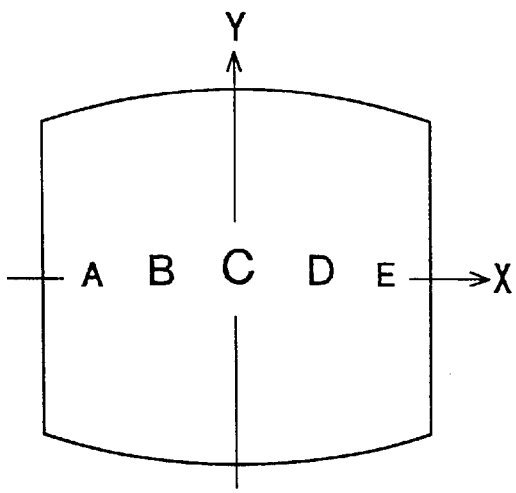
FIG. 14 is a diagram showing a barrel-like image distortion.

In FIG. 12, focus positions Xa, Xc, respectively focusing the points A, C of the object are: Xb>Xa, Xc>Xb. Therefore, moving the lens LS from the position Xa to the position Xc in synchronism with rotation of the mirror 16 from angle $\phi 1$ to angle $\phi 3$ enables, as shown in FIG. 13, picking up the light images from the point A to the point C on the sensing surface 19A of the CCD 19.

In the case where the object is inclined, Equations (8), (9) equivalent to Equations (4), (5) are used, and the distances Dt, Dt' are calculated in accordance with Equations (8), (9) using the object distance detected by the distance meter device 27 and the angles $\phi t$, $\phi t'$ detected by the position sensor 24:

$$Dt=RB/\{\sin(2\phi t)\cdot(1-\tan(\theta)/\tan(2\phi t)\}RB/\{\sin(2\phi t)-\tan(\theta)\cdot\cos(2\phi t)\} \qquad (8)$$

$$Dt'=RB/\{\sin(2\phi t')\cdot(1+\tan(\theta)/\tan(2\phi t')\}RB/\{\sin(2\phi t')+\tan(\theta)\cdot\cos(2\phi t')\} \qquad (9)$$

The distances Lrt, Lrt' are calculated in accordance with Equations (8), (9) and (6), (7) to calculate the position X of the lens LS when the mirror 16 is rotated at the angle $\phi$.

As mentioned above, the image where the entirety of the object is focused can be picked up by moving the taking lens 17 in synchronism with rotation of the mirror 16. However, in photographing an image according to the mirror scan method in which the mirror for scanning is disposed forward of the taking lens, it is a general case that a barrel-like image distortion as shown in FIG. 13 occurs, e.g., in the case where the object is not inclined.

There are two reasons for presence of a barrel-like image distortion. One reason is that, as shown in FIG. 9, a photographing magnification β is decreased as approaching toward opposite left and right ends of the object surface SO in FIG. 9 (in the x-axis direction) because the distance Dt from the reflected point R of the mirror 16 to the object surface SO is lengthened as the sensing point is shifted from the point B to the point A or the point C. Thereby, a scanned or sensed image is distorted along transverse and horizontal directions. The other reason is that the scan speed of the image in a transverse direction on the object surface SO varies when an angular velocity of the mirror 16 is set constant. Thereby, a sensed image is distorted along the transverse direction.

In order to avoid the above image distortion, the camera 1 corrects the image distortion due to an operation of mirror scan type image pickup and optical system when processing the image in the following manner, while controlling the mirror 16 to rotate at a constant angular velocity (i.e., $d(\phi t)/dt=d(\phi t')/dt=$constant value).

More specifically, in FIG. 9, a scan speed Vt between the points A and B on the object surface SO is expressed by Equation (10), and a scan speed Vt' between the points A and B on the object surface SO is expressed by Equation (11):

$$Vt=d(AB)/dt=\{D0/\cos^2(\gamma t)\}\cdot\{d(\gamma t)/dt\}=-\{2\cdot D0/\sin^2(2\phi t)\}\cdot\{d(\phi t)/dt\} \qquad (10)$$

$$Vt'=d(BC)/dt=\{D0/\cos^2(\gamma t')\}\cdot\{d(\gamma t')/dt\}=\{2\cdot D0/\sin^2(2\phi t')\}\cdot\{d(\phi t')/dt\} \qquad (11)$$

The scan speeds Vt, Vt' are calculated in accordance with Equations (10), (11) using the angles $\phi t$, $\phi t'$ of the mirror 16 which are detected by the position sensor 24 and the angular velocity: $(d(\phi t)/dt=d(\phi t')/dt=$constant value). Photographing magnifications mt, mt' at the sensing points T, T' are calculated using the above calculation results and the object distance D0. The photographed image is enlarged or reduced in the transverse direction using the calculated magnifications mt, mt' to correct an image distortion. The enlargement/reduction process is performed in a way similar to a correction process in an oblique photography correction mode which is described later.

In this way, controlling the angular velocity of the mirror 16 to make Vt=Vt' can prevent an image distortion in a transverse direction resulting from a change in the scan speeds, Vt, Vt'.

Further, the photographing magnification on the object surface SO varies also in the case where the object surface SO is inclined. Accordingly, an image distortion similar to the above occurs. Such image distortion can be corrected by applying the above idea.

Specifically, distances AB, BC are calculated in accordance with the following Equations (12), (13). Differentiating the solution (distances, AB, BC) obtained by Equations (12), (13) by the time t produces the scan speeds Vt, Vt' equivalent to Equations (10), (11).

$$AB=RB\cdot\tan(\gamma t)/\{\cos(\theta)\cdot(1-\tan(\theta)\cdot\tan(\gamma t)\}=D0/[\cos(\theta)\cdot\{\tan(2\phi t)-\tan(\theta)\}] \qquad (12)$$

$$BC=RB\cdot\tan(\gamma t')/(\{\cos(\theta)\cdot(1+\tan(\theta)\cdot\tan(\gamma t')\}=D0/[\cos(\theta)\cdot\{\tan(2\phi t')+\tan(\theta)\}] \qquad (13)$$

Referring back to FIG. 8, an image processing unit 25 applies a certain signal processing to an image signal outputted from the CCD 19 (light receiving signal of each pixel which is read out and outputted in time sequence). This signal processing includes an image distortion correction in the oblique photography correction mode.

The image processing unit 25 comprises an analog signal processor 251, an A/D converter 252, an image memory 253, a digital signal processor 254, and an output interface (I/F) 255. The analog signal processor 251 has a signal processing circuit such as an unillustrated Correlative Double Sampling (CDS) circuit and an analog amplifier. The image processing unit 25 applies a certain signal processing, such as a noise reduction and a level adjustment (amplification), to an image signal (analog signal) of each of color components of R, G, B which are outputted from the CCD 19.

The A/D converter 252 converts an image signal outputted from the analog signal processor 251 into a digital signal of e.g., 10-bit basis. The image memory 253 is a buffer memory which temporarily stores the digitized image signal (hereinafter, "image data"). The image memory 253 has a storage capacity corresponding to e.g., 3 frames, and stores image data of each of the color components of R, G, B therein.

The digital signal processor 254 includes an unillustrated processing circuit such as a gamma correction circuit, a shading correction circuit, and a compression circuit. The digital signal processor 254 reads out image data of each of the color components of R, G, B from the image memory 253 and applies a certain signal processing such as a gamma correction, a shading correction, and a compression. Further, the digital signal processor 254 corrects an image distortion resulting from an image pickup operation according to the mirror scan method in a normal photographing mode.

The digital signal processor 254 further comprises an oblique correction calculating unit 256, and corrects a geometrical distortion of an image which is photographed obliquely in the oblique photography correction mode (perspective image distortion). The image data which is subject to a signal processing by the digital signal processor 254 is updated and stored in the image memory 253 again.

The output I/F 255 is an interface which outputs (writes) image data which is subject to a signal processing by the digital signal processor 254 to the hard disk card 12.

Referring back to FIG. 7 showing the principle of the oblique photography correction, the portion between the points A and B on the light image AC needs a reduction correction, and the portion between the points B and C needs an enlargement correction. Accordingly, an actual two-dimensional image correction becomes complex. To avoid such complex image process, the oblique photography correction in this embodiment is performed in which one end of an oblique image K (see FIG. 15) corresponding to the closest position to the CCD 19 is set as a reference position, and the portion of the oblique image K at the opposite end is enlarged.

Figure 15:
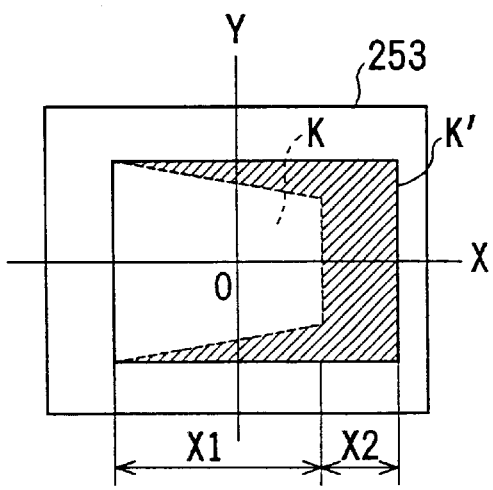
FIG. 15 is a diagram showing an oblique photography correction.

For example, as shown in FIG. 15, when the oblique image K is an image of the white board BD which is photographed from an obliquely left side, the oblique photography correction is conducted such that the closest position (in this case, a leftmost end of the photographed image) is set as the reference position, and the image on a rightmost end is enlarged.

Figure 16:
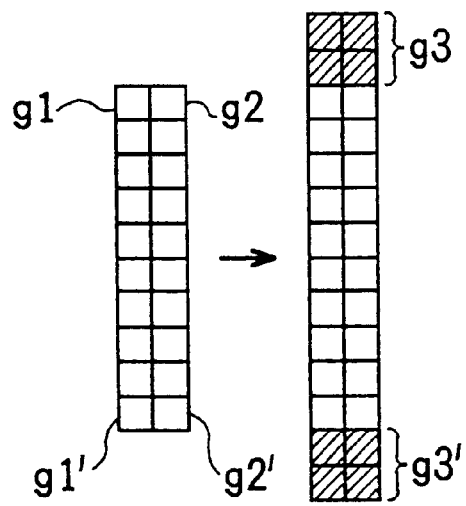
FIG. 16 is a diagram showing an interpolation of pixel data in a transverse direction in the oblique photography correction.

In this case, to produce a quasi front image K', pixel data which has not been picked up in a region X1 (corresponding to the left-side hatched portion in FIG. 15, or simply referred to as "missing pixel data") is interpolated by vertical line, as shown in FIG. 16, in such a manner that image data g3, g3' (image data represented by the hatched portion in FIG. 16) are added to image data g1, g1', g2, g2' at vertically opposite ends.

Figure 17:
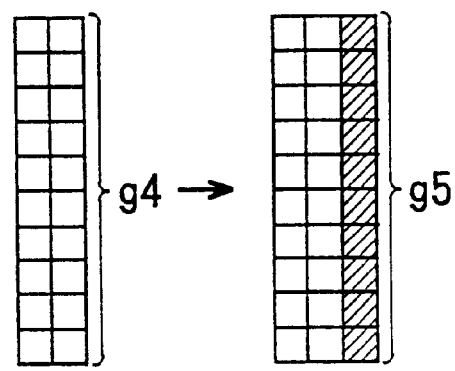
FIG. 17 is a diagram showing an interpolation of pixel data in a vertical direction in the oblique photography correction.

Likewise, pixel data which has not been picked up in a region X2 (corresponding to the right-side hatched portion in FIG. 16, also referred to as "missing pixel data") is interpolated, as shown in FIG. 17, in such a manner that image data g5 corresponding to a next vertical line is added to an entirety of image data g4 corresponding to known (already scanned) vertical lines. In this way, the oblique photography correction is executed.

Figure 18:
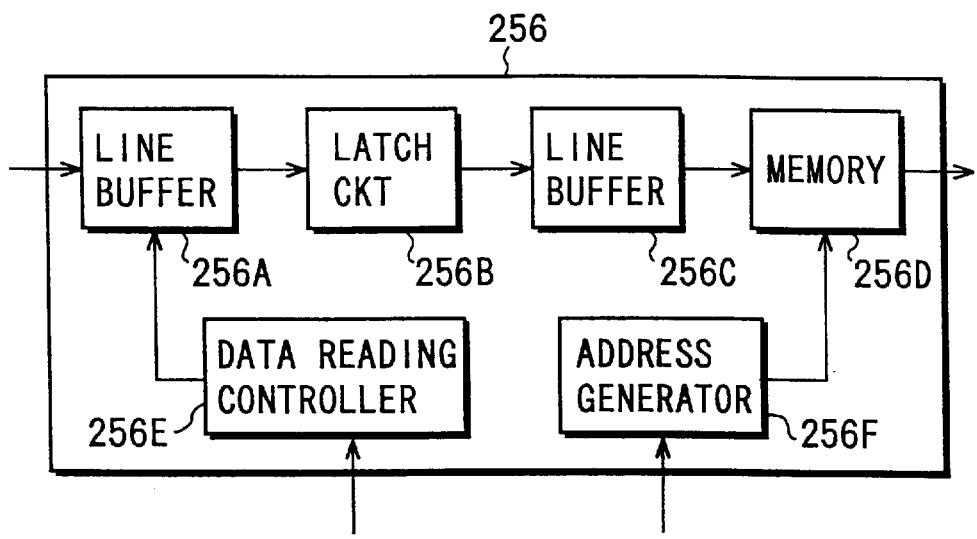
FIG. 18 is a block diagram showing a circuit arrangement of an oblique correction calculating unit.

FIG. 18 is a diagram showing a circuit arrangement of the oblique correction calculating unit 256. The oblique correction calculating unit 256 comprises line buffers 256A, 256C, a latch circuit 256B, a memory 256D, a data reading controller 256E, and an address generator 256F.

Figure 19:
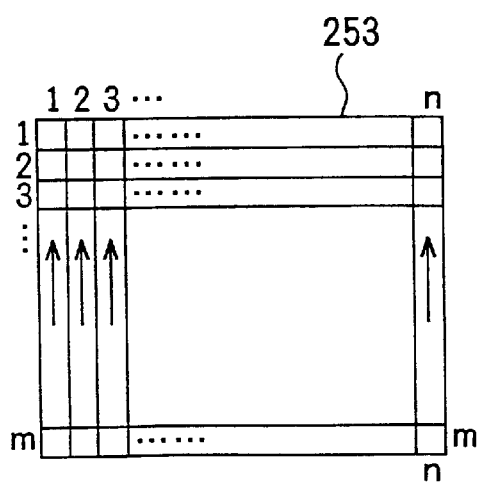
FIG. 19 is a diagram showing a reading direction when pixel data is read out from an image memory.

The line buffer 256A, as shown in FIG. 19, temporarily stores each pixel data read out from the image memory 253 as a unit (packet) of vertical line. The data reading controller 256E generates, based on a control signal from the control unit 32, a data read clock signal for reading each pixel data from the line buffer 256A, and outputs the data read clock signal to the line buffer 256A.

The pixel data is outputted from the line buffer 256A to the latch circuit 256B in synchronism with the data read clock signal outputted from the data reading controller 256E. At this time, an enlargement correction in a line direction (enlargement in a vertical line in FIG. 16) is conducted according to needs to perform the oblique photography correction per vertical line.

More specifically, in the case where pixel data is added to image data of a transversely long image in a vertical direction (Y-axis direction in the image memory 253 of FIG. 15), the data reading controller 256E suspends the output of data read clock signal to the line buffer 256A one or several clock pulses at timings corresponding to positions at which pixel data is to be added, and controls the line buffer 256A to output the same pixel data as immediately before the suspension for the suspended time.

The latch circuit 256B latches pixel data corresponding to one line which has undergone the oblique photography correction and outputted from the line buffer 256A, and outputs the latched pixel data to the line buffer 256C line after line. The line buffer 256C temporarily stores each pixel data outputted from the latch circuit 256B per line.

The memory 256D is a memory for storing image data which has undergone the oblique photography correction in the y-axis direction. The memory 256D including a Random Access Memory (RAM) stores pixel data which are successively outputted from the line buffer 256C line after line at predetermined storage positions. When all pixel data read out from the image memory 253 is stored in the memory 256D via the line buffer 256A, the latch circuit 256B, and the line buffer 256C, a halfway corrected image, i.e., an enlarged image of the oblique image K in the Y-axis direction is stored in the image memory 253.

The address generator 256F generates an address for each pixel data which is outputted to the image memory 253 again, and inputs the address to the memory 256D when the pixel data is outputted to the image memory 253. The address generator 256F sends an address to the memory 256D based on a control signal from the control unit 32.

By controlling the sending of address to the memory 256D, an enlargement correction of the oblique image K in the transverse direction (X-axis direction in the image memory 253 of FIG. 15) is performed, i.e., pixel data corresponding to missing line(s) is interpolated (addition of missing pixel data per line in FIG. 17). Thereby, the quasi front image K', i.e., an image of the oblique image K which has been corrected both in the transverse and vertical directions, is stored in the image memory 253.

Interpolation of pixel data for missing portion is conducted such that an address of pixel data of known (already sensed) portion is inputted to the image memory 253 for clock pulses corresponding to the missing portion, and pixel data of the known portion is read out repeatedly for the clock pulses to be added to the missing portion.

In this embodiment, data identical to the known pixel data is interpolated (added) to the position corresponding to the missing portion. This is likely to result in an awkward image density variation after the oblique photography correction. Adopting the density interpolation method as disclosed in e.g., Japanese Unexamined Patent Publication No. HEI 5-161000 and HEI 5- 161001 enables reproduction of an image with a more natural image density variation after the correction.

Referring back to FIG. 8, a card drive controller 26 controls driving of the hard disk card 12 to record image data thereon. The distance meter device 27 is provided at a rear position of the light projecting window 4 and the light receiving window 5 to detect an object distance. A light meter device 28 is provided at a rear position of the light meter window 3 to measure a brightness of the object. The light meter device 28 includes a light receiving element such as Silicon Photo Cell (SPC).

A ROM (Read Only Memory) 29 is a memory in which data necessary for controlling driving of the image pickup system and performing the oblique photography correction is stored. The ROM 29 stores drive characteristics of the mirror 16 and the focusing lens group of the taking lens 17 which are used in the mirror scan method.

A RAM 30 is a memory in which data necessary for performing the oblique photography correction and an image distortion correction (data such as the object distance Di and the photographing magnification mi used in reading each pixel data) are stored.

A switch group 31 includes the shutter release button 10, the zoom switch 11, and the main switch 13. A switch SM corresponds to the main switch 13. The switches S1, S2 are detection switches when the shutter release button 10 is partly pressed and fully pressed respectively. Switches SW, ST respectively detect that the zoom switch 11 is operated to the W-side and T-side.

The control unit 32 including a microcomputer centrally controls photographing of the camera 1. The control unit 32 includes an exposure controller 321 for calculating an exposure control value, an AF controller 322 for calculating a focal position of the taking lens 17, and an image processing controller 323 for controlling the image processing in the oblique photography correction and the image distortion correction.

The exposure controller 321 calculates an exposure control value (aperture value Av, shutter speed Tv) based on a brightness of an object which is detected by the light meter device 28. The AF controller 322 calculates a lens drive amount for adjusting the focal position of the taking lens 17 based on an object distance DO which is detected by the distance meter device 27. The image processing controller 322 calculates an object distance Di and a photographing magnification mi at each pixel position of the CCD 19 based on the rotation angle $\phi$ of the mirror 16 which is detected by the position sensor 24, the object distance D0 with respect to a middle position of the object in a field image which is detected by the distance meter device 27, the photographing magnification m0 at the measured point, and the inclination angle $\theta$ inputted by the mode setting switch 15.

The control unit 32 controls the exposure controller 321 to calculate the aperture value Av and the shutter speed Tv in photographing an image, and output the computation results respectively to the diaphragm drive controller 22 and the CCD drive controller 23. The lens drive amount for focus adjustment is calculated by the AF controller 322, and the computation result is inputted to the lens drive controller 21.

In the oblique photography correction mode, the control unit 32 controls the image processing controller 323 to calculate the object distance Di and the photographing magnification mi at each pixel position of the CCD 19, and the computation results are inputted to the digital signal processor 254.

The control unit 32 controls driving of the mirror drive controller 20, the lens drive controller 21, and the CCD drive controller 23 based on an exposure control value and an AF control value to control an image pickup operation according to the mirror scan method. Further, the control unit 32 controls driving of the image processing unit 25 and the card drive controller 26 to apply a certain image processing (including the oblique photography correction) to the scanned image and record the processed data on the hard disk card 12.

Figure 20:
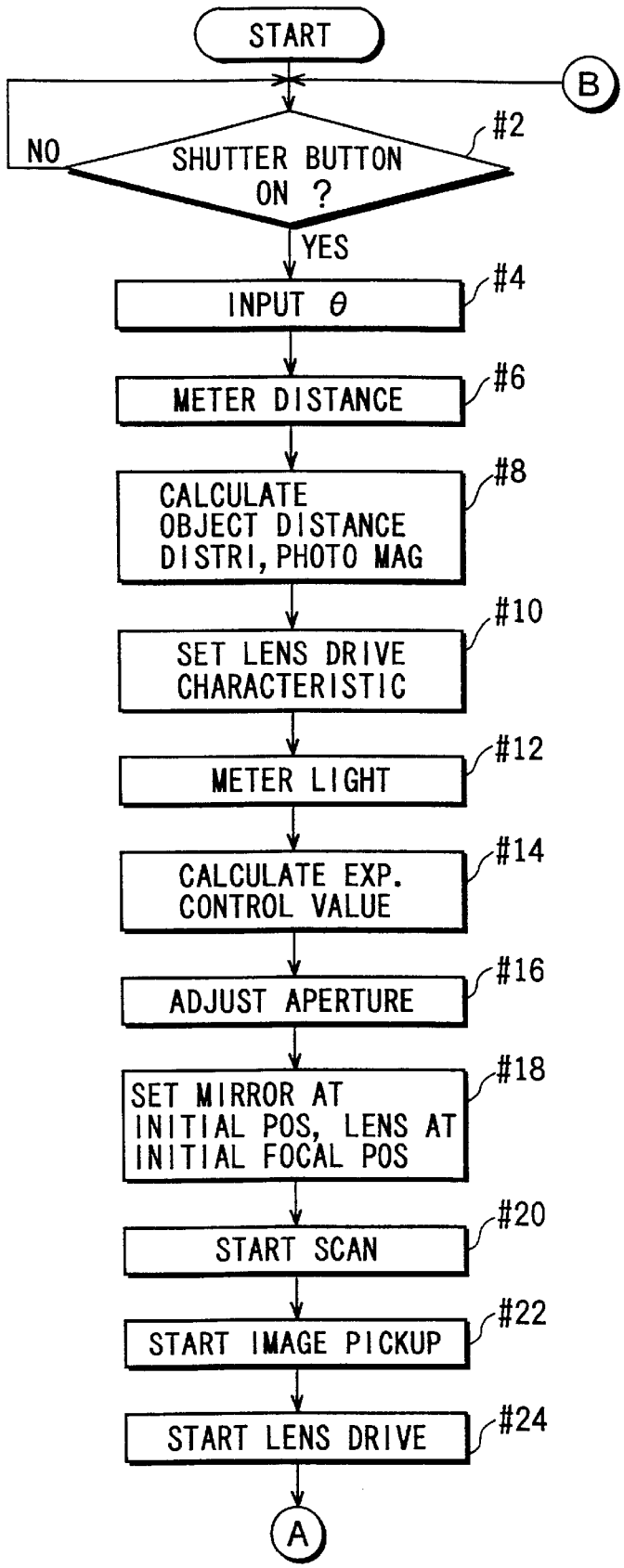
FIGS. 20 and 21 are flowcharts showing a photographing control in the first electronic camera.
Figure 21:
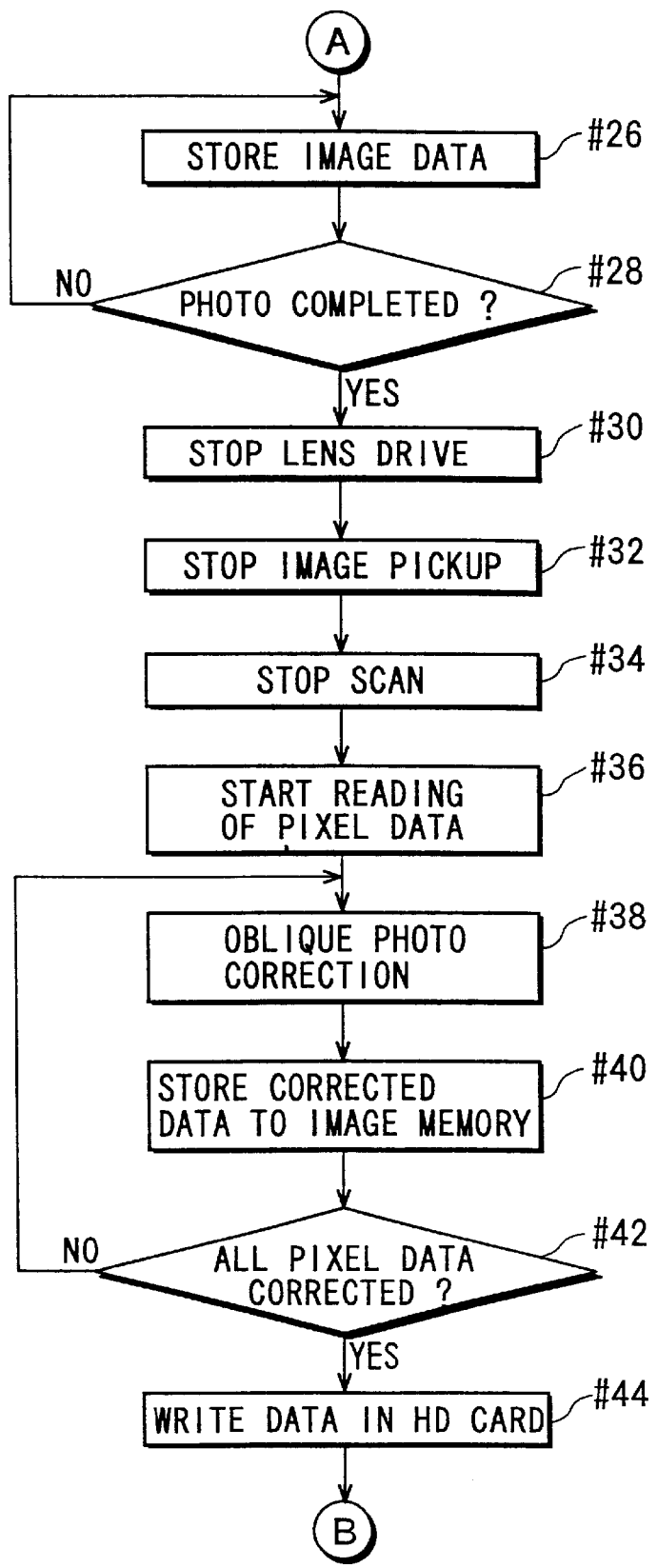

Next, photographing control of the camera 1 is described with reference to flowcharts of FIGS. 20 and 21.

When the main switch 13 is turned on to activate the camera 1, the camera 1 is set to a photograph enabled state (loop of Step #2). Upon manipulation of the shutter release button 10 by a photographer, and input of a signal indicative of instructing photographing (YES in Step #2), the inclination angle $\theta$ is inputted through the setting position of the operation button 15c of the mode setting switch 15 (in Step #4). When the inclination angle $\theta$ is 0°, it means that the camera 1 is in the normal photographing mode. Accordingly, an oblique photography correction of a photographed image is not executed. On the other hand, when the inclination angle $\theta$ is other than 0°, it means that the camera 1 is in the oblique photography correction mode. Accordingly, an oblique photography correction of a photographed image is executed.

Subsequently, data for metering the object distance is read out from the distance meter device 27, and calculated is an object distance D0 from the sensing surface of the CCD 19 at a reference point (point 0 in FIG. 15) to the object (distance RB in FIG. 9) based on the read out data (in Step #6). Data on the object distance distribution and the photographing magnification in the field image are calculated using the object distance D0, the inclination angle $\theta$ and the angles of view $\alpha i$, $\beta i$ with respect to each pixel position, and the resultant data is stored in the RAM 30 (in Step #8).

It should be noted that view angles $\alpha i$, $\beta i$ are calculated in advance and stored in the ROM 29 because the arranged positions of the taking lens 17, the mirror 16, and the CCD 19 are determined with respect to one another.

A focusing characteristic of the taking lens 17 is read out from the ROM 29 based on the object distance D0, and is set to the lens drive controller 21 (in Step #10). Subsequently, data on the brightness of the object is read out from the light meter device 28 (in Step #12), and an exposure control value is computed using the object brightness data (in Step #14).

Subsequently, the data on the aperture value Av of the exposure control value is outputted to the diaphragm drive controller 22 to adjust the opened amount of the diaphragm 18, and the data on the shutter speed Tv of the exposure control value is outputted to the CCD drive controller 23 (in Step #16).

Then, the mirror 16 is set at the initial scan position, and the taking lens 17 is set at the predetermined initial focal position (in Step #18). For instance, in FIG. 9, when the rotation angle: $\phi=\phi 1$ is set as a home position, the mirror 16 is set at the home position, and the taking lens 17 is set at the position: X=Xa (position where the light image of the point A is picked up on the sensing surface of the CCD 19).

Subsequently, rotation of the mirror 16 is initiated (in Step #20). At the same time, the CCD 19 starts picking up the object image (in Step #22), and the taking lens 17 starts moving to the specified lens position (in Step #24). More specifically, the focal position of the taking lens 17 is shifted in accordance with a lens drive characteristic shown in FIG. 10 to project slender light images (sub-images) of the object, image after image, on the sensing surface of the CCD 19 always in a focused state.

During the mirror scan operation, the sub-image which is picked up on the sensing surface of the CCD 19 is photoelectrically converted into an image signal at a predetermined cycle, and outputted to the image processing unit 25 (in Step #26). The image signal inputted from the image processing unit 25 is applied with a predetermined signal processing in the analog signal processor 251, converted into digital image data by the A/D converter 252, and stored in the image memory 253.

After image signals of all lines consisting of the entirety of the object light image are stored in the image memory 253 (YES in Step #28), the driving of the taking lens 17, the image pickup by the CCD 19, and the rotation of the mirror 16 are suspended (Steps #30 to #34), thereby completing the image reading of the field image.

Subsequently, the image signals (pixel data) stored in the image memory 253 are started to be inputted to the digital signal processor 254 (in Step #36). The pixel data stored in the image memory 253 is read out therefrom line after line, and subject to the enlargement correction in a vertical direction per line in the oblique correction calculating circuit 256 of the digital signal processor 254. Thereafter, the pixel data is subject to the enlargement correction in a transverse direction while outputting the data from the oblique correction calculating circuit 256 to the image memory 253 (re-recording of the pixel data in the image memory 253), thus completing the oblique photography correction (Steps #38 and #40).

In the oblique photography correction, the image processing controller 323 of the control unit 32 calculates a pixel position which is to be added in the vertical enlargement process to output the calculation result to the data reading controller 256E, while calculating a pixel position which is to be added in the transverse enlargement process is calculated to output the calculation result to the address generator 256F, using the object distance Di and the photographing magnification mi corresponding to each pixel position.

The data reading controller 256E controls output of the data read clock signal to control output of the pixel data from the line buffer 256A to the latch circuit 256B. Thereby, the enlargement correction in the vertical direction is performed. The address generator 256F generates an address for the output of the pixel data from the memory 256D to the image memory 253. Thereby, the enlargement correction in the transverse direction is performed.

Upon completion of re-recording of all the pixel data in the image memory 253 (YES in Step #42), the oblique correction is terminated. Subsequently, the image data after the oblique correction is transferred to the hard disk card 12 via the output I/F 255 (in Step #44). Thereby, photographing of one field image is completed, and the routine returns to Step #2 to perform photographing of a next field image.

Next, a second camera embodying the invention is described. The same elements as those described in the first embodiment are indicated as the same reference numerals.

Figure 22:
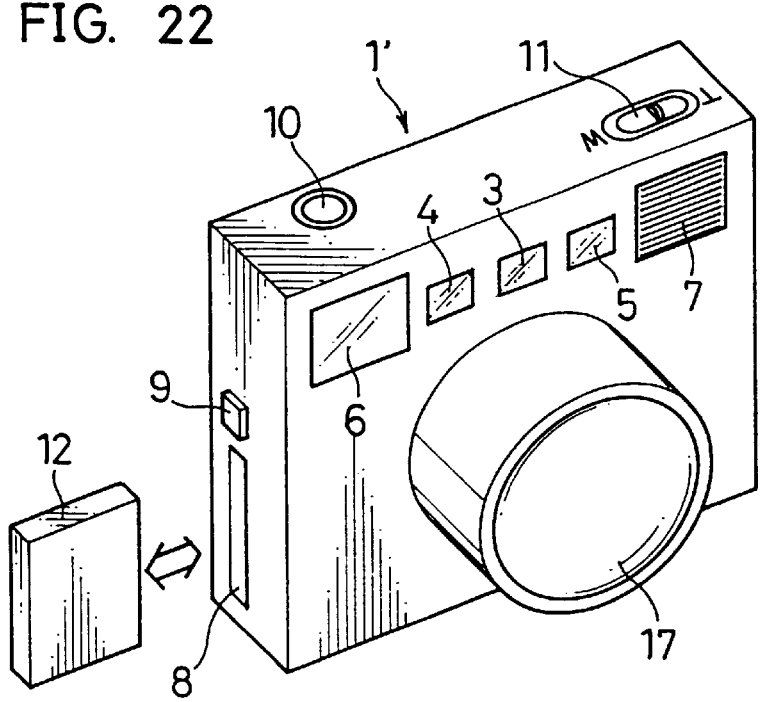
FIG. 22 is a perspective view showing an external configuration of a second electronic camera embodying the present invention.
Figure 23:
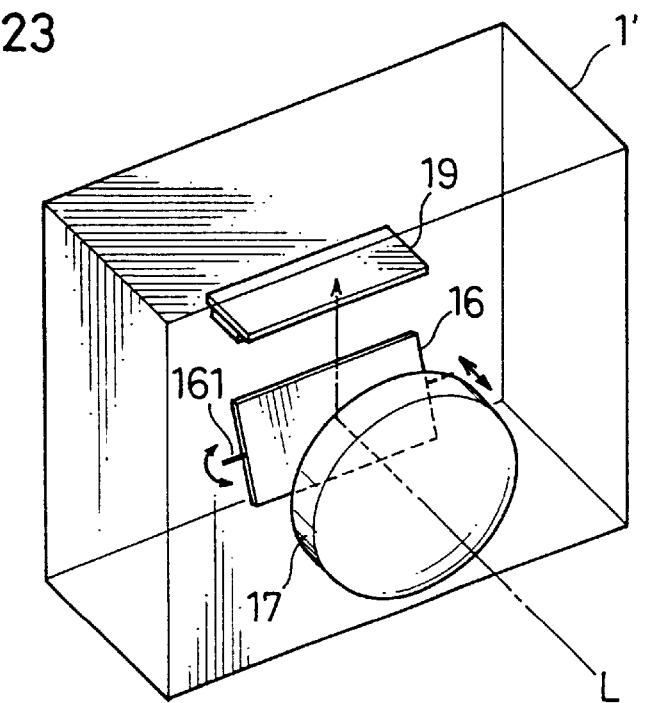
FIG. 23 is a schematic construction diagram of an image pickup and optical system of a mirror scan type provided in the second electronic camera.

FIG. 22 is a perspective view showing an external configuration of a second electronic camera according to this invention. FIG. 23 is a schematic construction diagram of a mirror scan type image pickup and optical system provided in the second electronic camera.

The electronic camera in this embodiment is constructed in such a manner that a mirror 16 for scanning is disposed at a rear position of a taking lens 17. Accordingly, the taking lens 17 in FIG. 22 is projected outward, in place of the arrangement of the first embodiment where the taking window 2 is formed in the camera 1 (see FIG. 1).

The image pickup and optical system of the second electronic camera 1' is such that, as shown in FIG. 23, the taking lens 17, the mirror 16, and a CCD 19 are arranged in this order in a vertically upward direction (y-axis direction in FIG. 3) of the camera 1'. A diaphragm 18 is disposed in a unit of the taking lens 17, and therefore, is not shown in FIG. 23.

Figure 24:
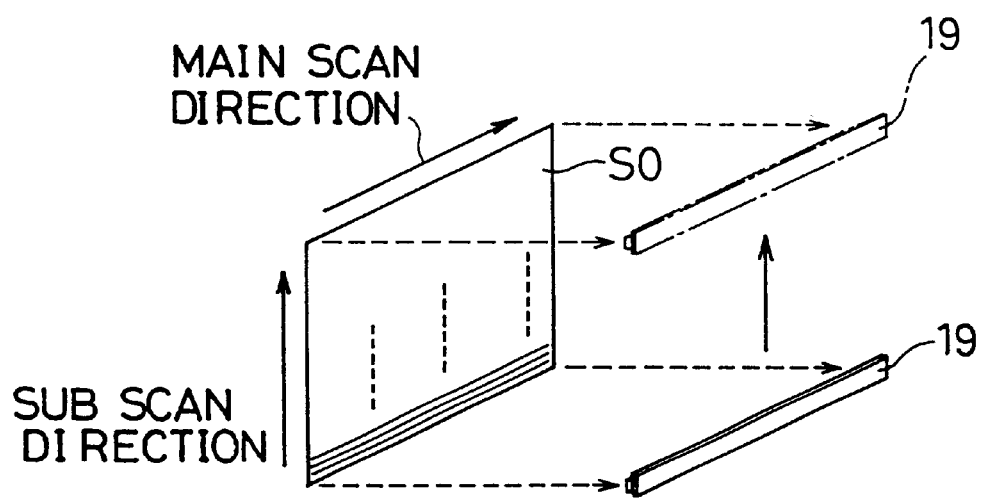
FIG. 24 is a perspective view showing an arranged position and a scan direction of an image pickup device (line image sensor) relative to a light image of an object in the mirror scan type image pickup and optical system of the second electronic camera.

Referring to FIG. 23, the image pickup and optical system of this embodiment is operated in such a manner that a sensing surface 19A of the CCD 19 relatively scans an object surface SO in a sub-scan direction (vertical direction in FIG. 24) by rotating the mirror 16, and the CCD 19 is driven in synchronism with the relative scanning (rotation of the mirror 16) to execute photographing.

The second electronic camera 1' is different from the first electronic camera 1 in the arrangement position of the mirror 16. Also, a block construction diagram for the second embodiment is different from the block diagram of FIG. 8 only in that the taking lens 17 and the diaphragm 18 of the second embodiment are arranged in a forward side of the mirror 16. Accordingly, a description on the block diagram of the camera 1' is omitted herein. Further, photographing control of the second camera 1' is basically identical to the photographing control of the first camera 1 shown in FIGS. 20 and 21, and accordingly, description thereof is omitted herein.

Figure 25:
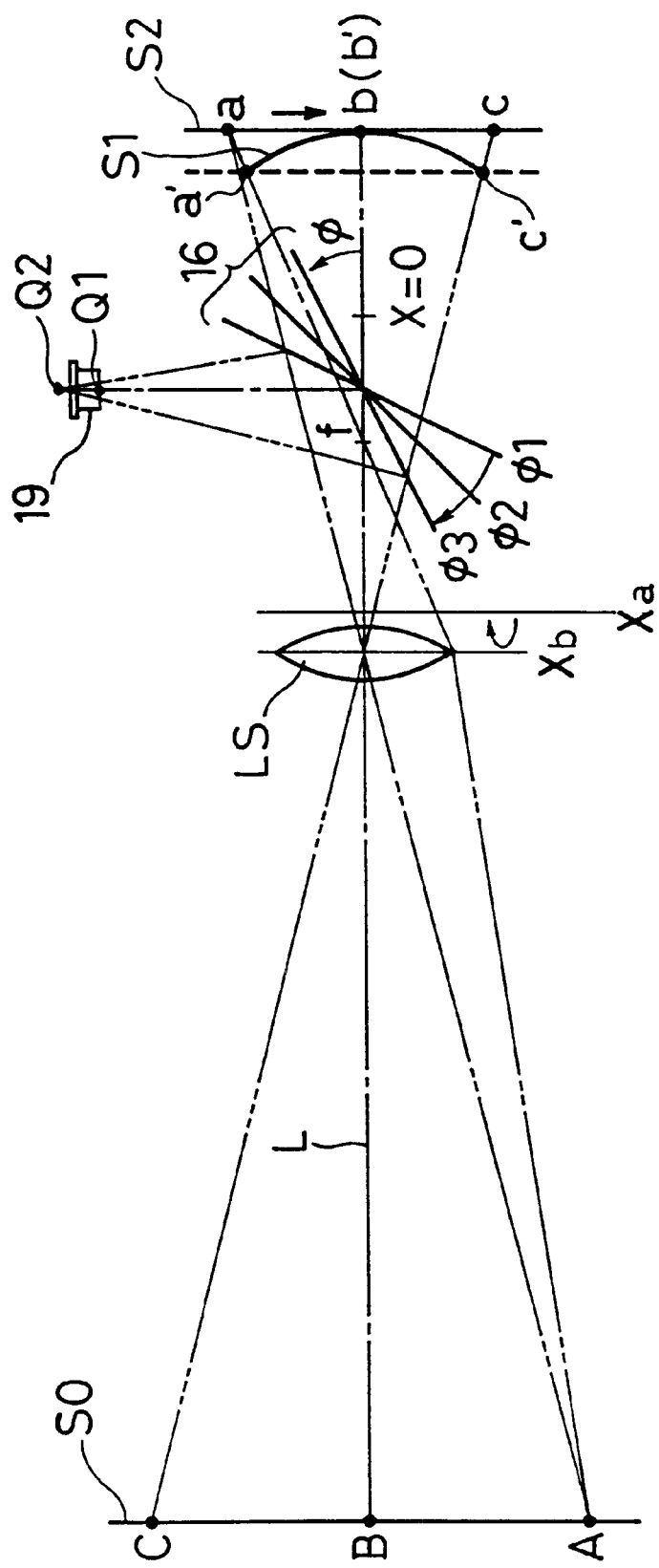
FIG. 25 is a diagram showing the image pickup and optical system of the second electronic camera viewed from a side direction.

FIG. 25 is a diagram showing a relationship between an object surface, a focus plane and a sensing surface according to a mirror scan image pickup and optical system in which a mirror for scanning is disposed on a rear side of a taking lens in the case where the object surface SO is not inclined.

In FIG. 25, a lens LS is a convex lens equivalent to the taking lens 17. The object surface SO corresponds to the display surface of the white board BD in FIG. 5, and a point Q1 is a point on the sensing surface of the CCD 19. When the mirror 16 is rotated at angles of $\phi 1$, $\phi 2$, $\phi 3$ which are defined by a reflected surface of the mirror 16 and an optical axis L, light images of points A, B, C on the object surface SO are respectively projected on the sensing surface of the CCD 19.

FIG. 25 shows a state that a focus position of the lens LS is set so as to focus the light image of the point B on the sensing point Q1 of the CCD 19. When the mirror 16 is set at an angle position $\phi 1$ (or $\phi 3$) in a state that the focus position of the lens LS is held at the position of FIG. 25, the light image of the point A (or point C) is projected on the sensing surface of the CCD 19. However, at this time, the light image of the point A (or point C) is focused at a position Q2 which is away from the sensing position Q1 of the CCD 19 backward by a distance (in a direction away from the mirror 16) owing to a difference of the length of optical path. Accordingly, when the CCD 19 scans the object surface SO from the point A to the point C by variably setting the position of the mirror 16 from angle $\phi 1$ to angle $\phi 3$, the focus position of the object surface SO reciprocates between the positions Q2 and Q1.

A flat surface S2 in FIG. 25 is on a plane which perpendicularly intersects an optical axis L and is disposed at an imaginary position equivalent to the sensing surface of the CCD 19. This imaginary surface S2 is a sensing surface when an area sensor is used as an image sensor. When the area sensor is used, the light images of the points A to C on the object surface SO are focused on points a to c on the sensing surface S2 in a state that an entirety of a synthesized light image is substantially in focus.

The sensing surface of the CCD 19 (linear sensing surface) relatively scans the object surface SO by rotating the mirror 16. The sensing surface can be thought to correspond to a curved surface S1. This curved surface S1 (or sensing surface S1) is a convex surface which protrudes toward the sensing surface S2, and an outermost point thereof coincides with the point b on the sensing surface S2.

Figure 26:
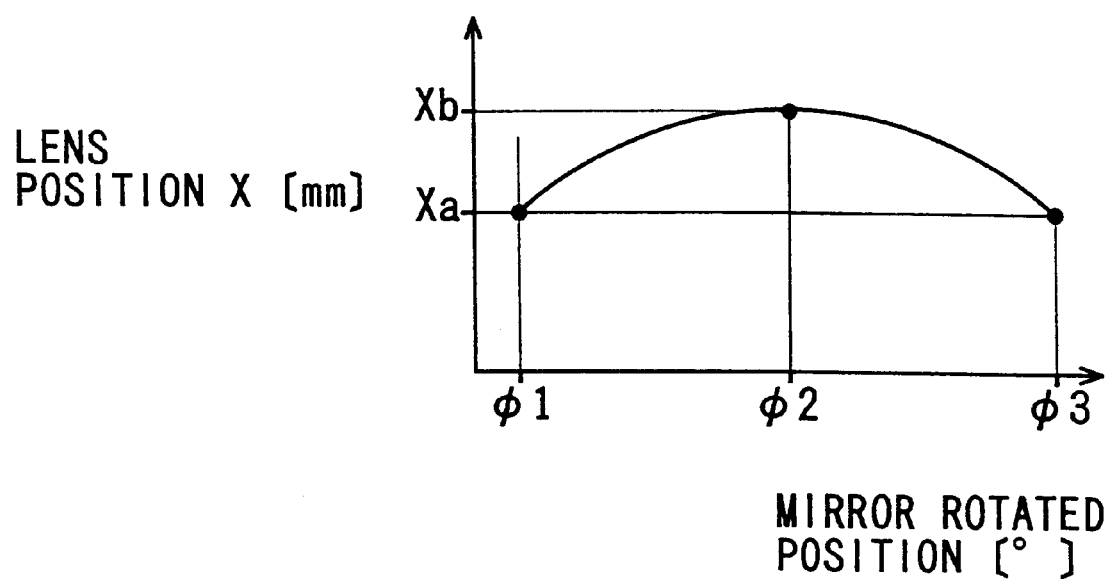
FIG. 26 is a diagram showing a lens drive characteristic in the mirror scan type optical system of the second electronic camera when an object surface is not inclined.

Accordingly, when the sensing surface S1 is set as a reference surface, and the focal state of the light images from the points A to C is judged, only the light image of the point B is perfectly in focus, and light images other than the point B are focused on a rear side of the sensing surface S1. Accordingly, in the second camera 1', the lens LS is driven to reciprocate between positions Xa and Xb in synchronism with rotation of the mirror 16 from angle $\phi 1$ to angle $\phi 3$, as shown in FIG. 26, to focus all the light images from the point A to the point C on the sensing surface of the CCD 19, where the focal position of the point A (or point C) is set at Xa, the focal position of the point B is set at Xb, and Xb>Xa.

In FIG. 25, the object surface SO is in parallel with a lens plane of the lens LS, and the points A, C are symmetrical with respect to the point B. Accordingly, the sensing surface S1 is shaped into a curved surface (corresponding to a circumference of a cylindrical shape) with an upper curve and a lower curve are symmetrical to each other with respect to the point b. Thereby, a variation of the position of the lens LS in FIG. 26 is represented by an arc in which a left side curve and a right side curve are symmetrical to each other with respect to the angle φ2 of the mirror 16.

Figure 27:
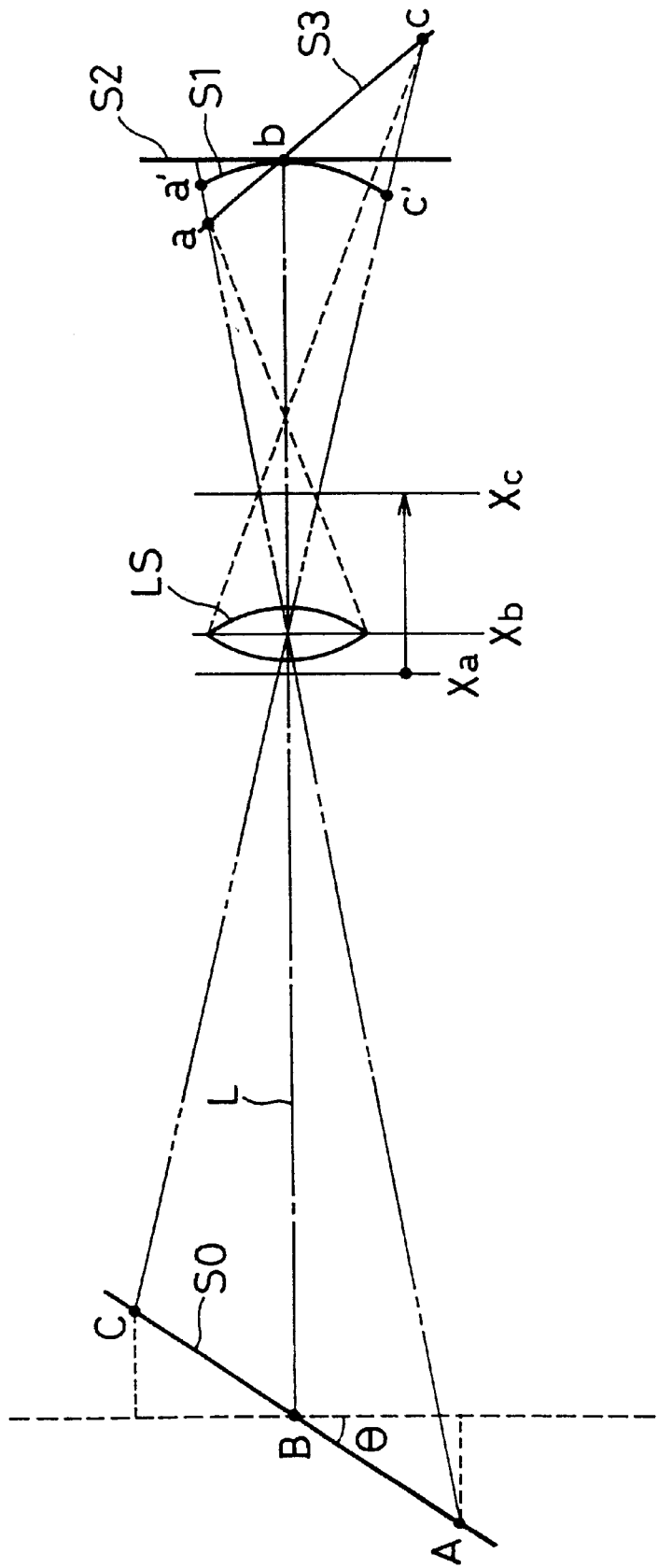
FIG. 27 is a diagram showing the mirror scan type optical system of the second electronic camera viewed from a side direction when the object surface is inclined.

FIG. 27 is a diagram showing a relationship between an object surface, a focus plane and a sensing surface according to the mirror scan method in which a mirror for scanning is disposed at a rear side of a taking lens in the case where the object surface SO is inclined.

FIG. 27 is different from FIG. 25 in that the object surface SO is inclined at angle of θ with respect to the lens plane of the lens LS and the mirror 16 is omitted. In FIG. 25, since the inclination angle θ is 0°, the light images from the point A to the point C are focused on the sensing surface S2. However, in FIG. 27, since the object surface SO is inclined, a focus plane S3 on which the light images from the point A to the point C are focused is inclined with respect to the sensing surface S2.

On the focus plane S3, a portion between points a and b is inclined toward the lens LS than the sensing surface S2 as departing from the point b, because a corresponding portion between the points A and B on the object surface SO is farther away from the lens LS as departing from the point B. On the other hand, a portion between points b and c is inclined away from the lens LS than the sensing surface S2 as departing from the point b, because a corresponding portion between the points B and C comes closer to the lens LS as approaching toward the point B. The sensing surface S1 is curved into a concave surface with respect to the lens LS, whereas the sensing surface S2 is substantially flat. Accordingly, when the sensing surface S1 is set as a reference surface, and a focal state of the light images from the point A to the point C is judged, the light images of the portion between the points A and B are focused forward of the sensing surface S1, whereas the light images of the portion between the points B and C are focused rearward of the sensing surface S1.

Accordingly, in FIG. 27, the lens LS needs to be driven in such a manner that the lens position X is moved toward the object surface SO from the position Xb when the angle of mirror 16: φ=φ2 by a certain distance, i.e., to the position Xa when the angle of mirror 16: φ=φ1 to focus the light image of the point A on point a' on the sensing surface S1, whereas the lens position X is moved toward the sensing surface S1 from the position Xb by a certain distance, i.e., to the lens position Xc when the angle of mirror 16: φ=φ3 to focus the light image of the point C on point c' on the sensing surface S1.

Figure 28:
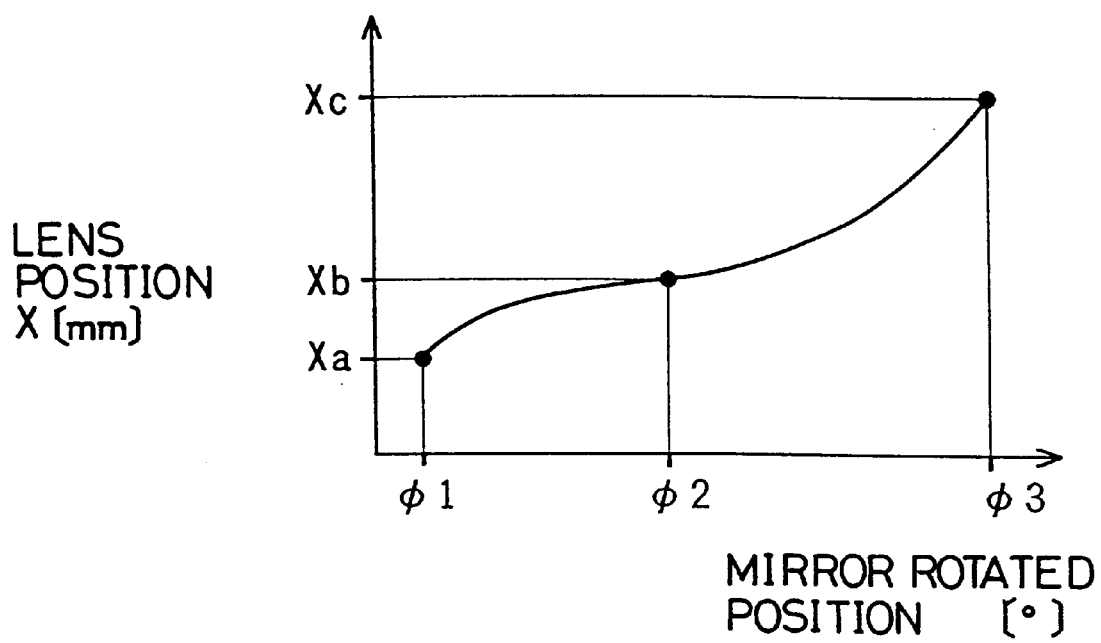
FIG. 28 is a diagram showing a lens drive characteristic in the mirror scan type optical system of the second electronic camera when the object surface is inclined.

To summarize the arrangement of FIG. 27, when the object surface SO is inclined, the lens LS is moved between the positions Xa and Xc in synchronism with rotation of the mirror 16 from angle φ1 to angle φ3, as shown in FIG. 28, in such a way as to match the focus plane S3 with the sensing surface S1.

According to the image pickup system of mirror scan type in which the mirror 16 is disposed on a rear side of the taking lens 17, the sensing surface S1 is curved and the focus plane of the object light image is not normal to the optical axis L. Accordingly, control of the lens position X of the lens LS with respect to the rotation angle φ of the mirror 16 is nonlinear (see FIG. 28).

Figure 29:
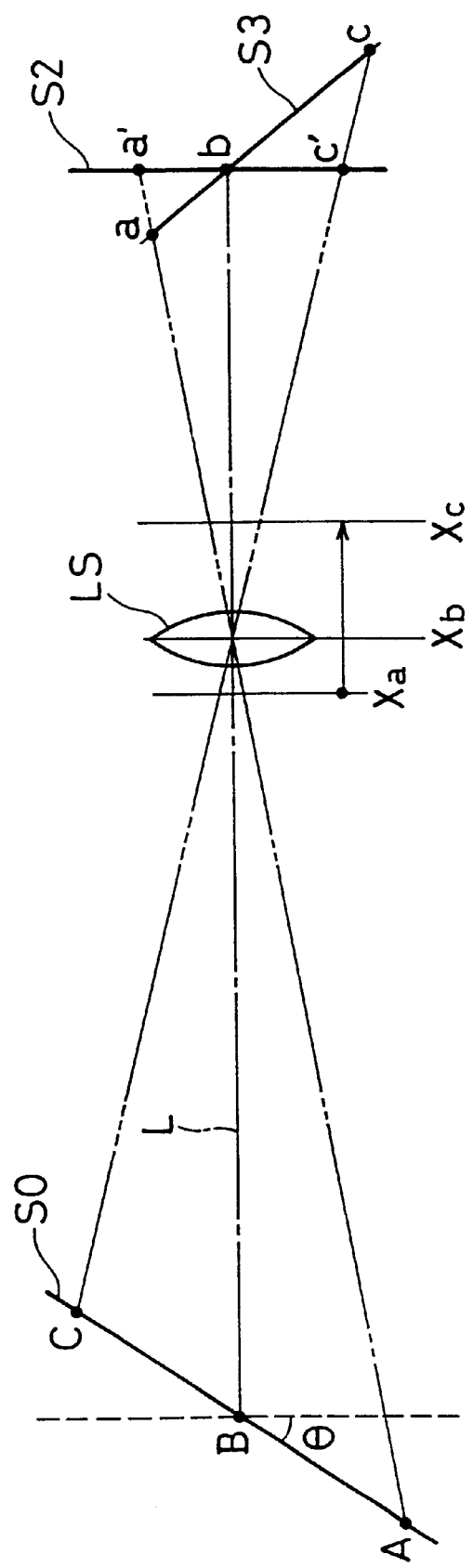
FIG. 29 is a diagram showing an image pickup and optical system of a linear scan type when the surface of the object is inclined.

Referring to FIG. 29, in the case where the object surface SO is inclined, the focus plane S3 is inclined with respect to the sensing surface S2 of the area sensor, even when photographing is performed by the area sensor. Accordingly, similar to the case of FIG. 27, when the sensing surface S2 is set as a reference surface, and the focal state of the light images from the point A to the point C is judged, the light images of the portion between the points A and B are focused forward of the sensing surface S2, whereas the light images of the portion between the points B and C are focused rearward of the sensing surface S2.

However, in the case of the area sensor, the sensing surface S2 is not curved, whereas the sensing surface according to the mirror scan type is curved. Accordingly, in the area sensor, the lens position X of the lens LS when picking up the light image of the point A comes closer to the position Xb than the case of mirror scan type image pickup system. Likewise, the lens position X of the lens LS when picking up the light image of the point C comes closer to the position Xb than the case of mirror scan type image pickup system. Further, control of the lens position X of the lens LS when scanning each light image from the point A to the point C is represented by a line graph as shown in FIG. 30.

Figure 30:
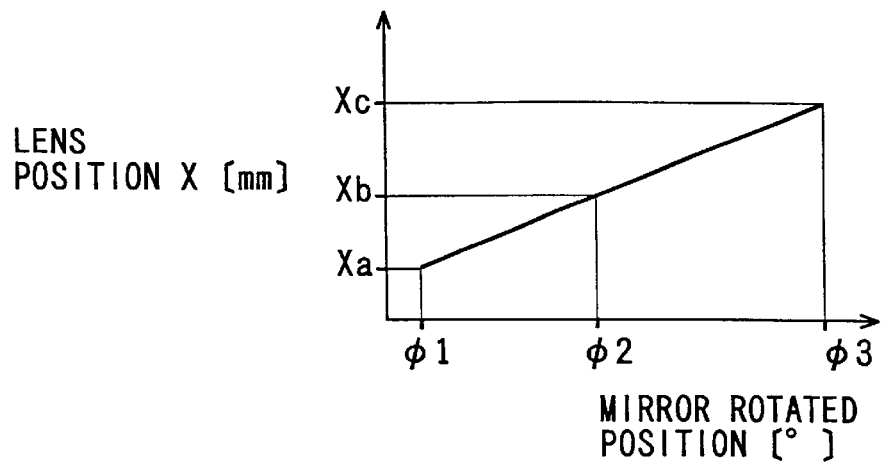
FIG. 30 is a diagram showing a lens drive characteristic of the optical system of the linear scan type when the surface of the object is inclined.

Accordingly, also in a linear scan method in which an image is scanned line after line by moving a line image sensor on the sensing surface S2, controlling the position X of the lens LS as shown in FIG. 30 enables picking up an entirety of an object image in a focused state even when the object surface SO is inclined.

It should be noted that even when an area sensor is used, scanning a plurality of sub-images while variably moving the lens LS, extracting focused sub-images among the scanned sub-images, and synthesizing the focused sub-images enables picking up an object image over its entirety in a focused state, similar to the linear scan type image pickup system.

In particular, when correcting an image in the oblique photography correction mode, it is desirable to focus an entirety of a field image. Accordingly, in a camera having the oblique photography correction function, it is preferable to divide an object light image into a plurality of sub-images, and adjust the position of the lens LS each time when the sub-image is scanned to focus an entirety of the object light image, irrespective of the type (mirror scan type or linear scan type).

In the foregoing embodiments, the inclination angle θ is manually inputted. As an altered form, the inclination angle θ may be automatically inputted.

Figure 31:
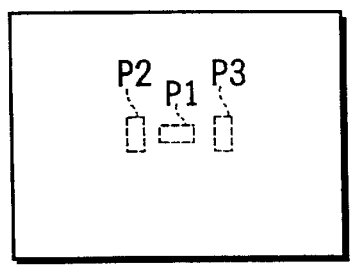
FIG. 31 is a diagram showing metering areas according to a multiple-spot metering method.

For instance, in the case where a multiple-spot metering method is adopted as shown in FIG. 31 in which three different metering areas P1, P2, P3 are provided in a field image, inclination angle (tan(θ)) can be calculated based on object distances $D_{P1}$, $D_{P2}$, $D_{P3}$ which are respectively detected in the metering areas P1, P2, P3.

Figure 32:
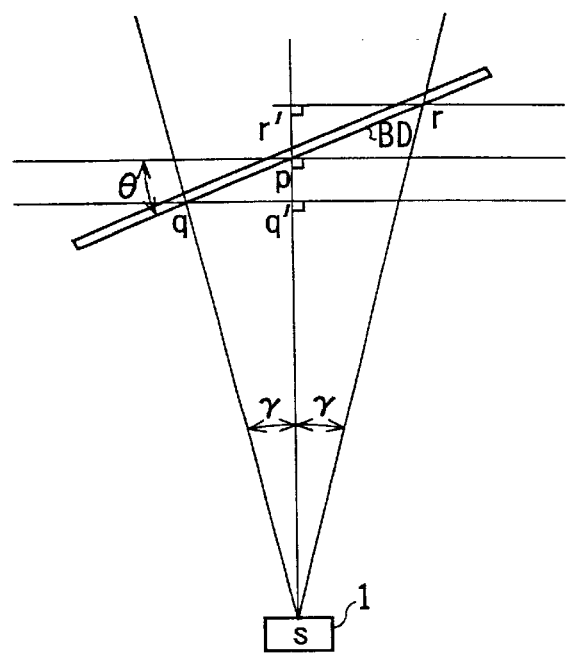
FIG. 32 is a diagram showing a method for automatically calculating an inclination angle according to the multiple-spot metering method.
Figure 33:
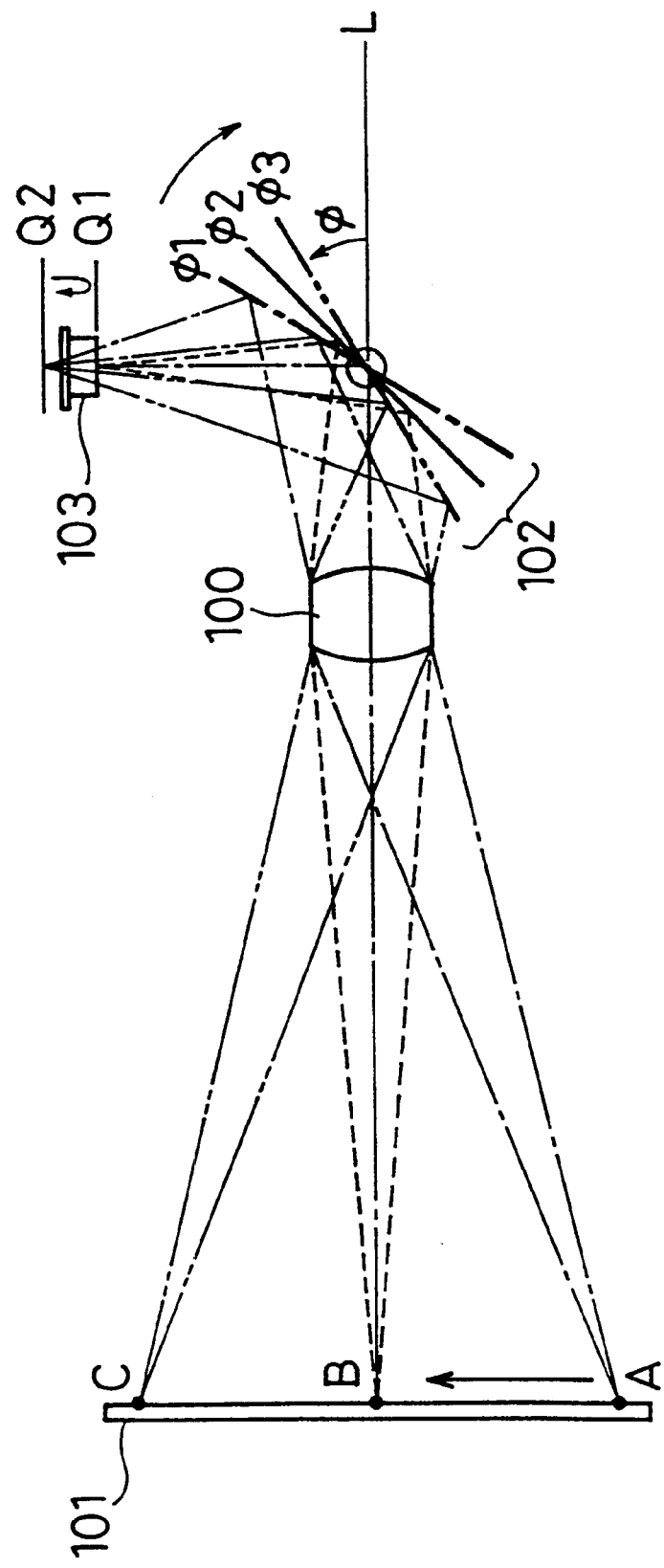
FIG. 33 is a diagram showing a schematic construction diagram of a conventional mirror scan type optical system.

Specifically, as shown in FIG. 32, in the case that the point s is a reference point of a camera 1 for metering, the points p, q, r correspond to metering areas P1, P2, P3 of a white board BD, ∠qsp=∠rsp=γ, the point q' is an intersecting point of a center line passing the points s and p and a line passing the point q and being normal to and the center line, and the point r' is an intersecting point of the center line and a line passing the point r and being normal to the center line, $$D_{P1}=sp, D_{P2}=sq', D_{P3}=sr'$$

$$rr'=sr'\cdot\tan(\gamma)$$

$$\tan(\theta)=pr'/rr'=(sr'-sp)/rr'$$

or $$qq'=sq'\cdot\tan(\gamma)$$

$$\tan(\theta)=pq'/qq'=(sp-sq')/qq'$$

Accordingly, the inclination angle tan(θ) is calculated in accordance with the following Equation (14).

$$\tan(\theta) = (D_{P3} - D_{P1})/\{D_{P3} \cdot \tan(\gamma)\} = (D_{P1} - D_{P2})/\{D_{P2} \cdot \tan(\gamma)\} \quad (14)$$

Since tan(γ) is a value inherent to a metering sensor of the camera 1, the inclination angle θ can be automatically inputted based on the object distance $D_{P1}$, $D_{P2}$, $D_{P3}$ which are respectively calculated with respect to the metering areas P1, P2, P3.

The above-mentioned lens position characteristic can be calculated based on the rotated position of the mirror 16 (and the inclination angle θ in the case where the object surface SO is inclined).

Alternatively, the lens position characteristic may be calculated using the above values as parameters, the calculation result may be stored in the ROM 29 in advance, and the focus position of the taking lens 17 may be controlled using the lens position characteristic which is stored in the ROM 29 based on the detected object distance D0 and the rotated position ϕ of the mirror 16 (along with the inclination angle θ if necessary). In this case, the object distance, the rotated position ϕ of the mirror 16, and the inclination angle θ may be set as primary parameters, whereas a distance from the taking lens 17 to a center of rotation of the mirror 16, and a rotated range of the mirror 16 may be set as sub-parameters to set the lens position characteristic individually for cameras.

In the aforementioned embodiments, merely the focal position of the taking lens 17 is varied by driving the focusing lens group of the taking lens 17. As an altered form, in the case where the taking lens 17 includes a zoom lens, it may be appreciated to change the zooming ratio in synchronism with rotation of the mirror 16. Changing of the zooming ratio compensates for an image distortion due to a varied photographing magnification and a perspective image distortion due to an inclination of object surface, consequently reducing the burden of correcting image distortion in the image processing.

In the case of a taking lens having a single lens capable of varying the thickness or the curvature thereof to change the focal length, it may be appreciated to vary the curvature in synchronism with rotation of the mirror 16.

In the foregoing embodiments, the present invention is described with an electronic camera. However, the present invention is applicable to a camera which uses a silver halide film, and an image reader for reading text or images on a book, a document or the like.

As mentioned above, an image pickup apparatus is constructed in such a manner that a light image of an object which is projected on an exposing surface of a photosensitive member by a taking lens is divided into a plurality of sub-images, and the sub-images are successively exposed on the photosensitive member to perform pickup of the object light image. A focal position of the taking lens is calculated with respect to the sub-images, sub-image after sub-image, and the taking lens is moved to the focal position each time the sub-image is picked up.

Consequently, the object light image can be picked up with its entirety in a focused state without providing a complicated image pickup and optical system. Further, focal adjustment on the entirety of the object image is enabled without considering the depth of field, thereby improving the operability of exposure control.

Further, the photosensitive member including a line image sensor is arranged at a position different from an optical axis of the taking lens, a reflective mirror is arranged at such a position as to vary a reflected surface thereof with respect to the optical axis. The reflected surface of the reflective mirror is varied to project a sub-image onto a slender sensing surface of the photosensitive member. The lens position of the taking lens is moved in accordance with the variation of the reflected surface of the reflective mirror. This makes it possible to obtain a focused image over its entirety without providing a special mechanical arrangement for an image pickup and optical system.

Further, the distance between the image pickup apparatus and a part of the object corresponding to a sub-image, and the angle between the reflected surface of the reflective mirror and the optical axis of the taking lens are detected, and the predetermined position (focal position) of the taking lens with respect to each of the sub-images is set based on the detection results and the focal distance of the taking lens. Accordingly, the focal position of the taking lens with respect to each of the sub-images can be easily set.

Furthermore, in the case where the object surface is inclined with respect to the exposing surface of the photosensitive member at a certain angle, the inclination angle is variably settable, and the predetermined position (focal position) of the taking lens with respect to each of the sub-images is set based on the set inclination angle. Consequently, an object image over its entirety in a focused state can be obtained even in the case of picking up an oblique image.

Although the present invention has been fully described by way of example with reference to the accompanying drawings, it is to be understood that various changes and modifications will be apparent to those skilled in the art. Therefore, unless otherwise such change and modifications depart from the scope of the invention, they should be construed as being included therein.

What is claimed is:

1. An image pickup apparatus comprising:

a photosensitive member;

a light image introducer which introduces respective light images of divided parts of an object part-by-part onto the photosensitive member, the light image introducer including a taking lens and a rotatable mirror;

a distance information generator which generates distance information for each divided part of the object based on a distance to the object detected by a distance detector and a rotated position of the mirror; and a lens driver which drives the taking lens based on generated distance information.

2. An image pickup apparatus according to claim 1, wherein the photosensitive member includes a line image sensor.

3. An image pickup apparatus according to claim 1, wherein the mirror is rotatable about an axis intersecting an optical axis of the taking lens.

4. An image pickup apparatus according to claim 3, wherein the mirror is disposed between the object and the taking lens.

5. An image pickup apparatus according to claim 3, wherein the mirror is disposed between the taking lens and the photosensitive member.

6. An image pickup apparatus according to claim 1, wherein the distance information generator further includes an angle setter which sets an angle between a surface of the object and a surface of the photosensitive member.

7. An image pickup apparatus according to claim 1, wherein said image pickup apparatus is a camera.

8. An image pickup apparatus comprising:

a photosensitive member;

a light image introducer which introduces respective light images of divided parts of an object part-by-part onto the photosensitive member, the light image introducer including a taking lens;

a distance information generator which generates distance information for each divided part of the object, the distance information generator including a distance detector which detects a distance to the object; and a lens driver which drives the taking lens based on generated distance information, wherein the distance information generator further includes an angle setter which sets an angle between a surface of the object and a surface of the photosensitive member, and wherein the distance detector detects distances to a plurality of points on the object, and the angle setter sets an angle based on detected distances to the plurality of points.

9. An image pickup apparatus comprising:

a photosensitive member;

a light image introducer which introduces respective light images of divided parts of an object part-by-part onto the photosensitive member, the light image introducer including a taking lens;

a distance information generator which generates distance information for each divided part of the object, the distance information generator including a distance detector which detects a distance to the object; and a lens driver which drives the taking lens based on generated distance information, wherein the distance information generator further includes an angle setter which sets an angle between a surface of the object and a surface of the photosensitive member, and wherein the distance information generator generates distance information based on a distance detected by the distance detector and an angle set by the angle setter.

10. An image pickup apparatus comprising:

an image sensor;

a light image introducer which introduces respective light images of divided parts of an object part-by-part onto the image sensor, the light image introducer including a taking lens and a rotatable mirror;

a distance information generator which generates distance information for each divided part of the object based on a distance to the object detected by a distance detector and a rotated position of the mirror;

a lens driver which drives the taking lens based on generated distance information; and an image corrector which corrects output of the image sensor to eliminate an image distortion caused by an oblique image pickup.

11. An image pickup apparatus according to claim 10, wherein the image sensor is a line image sensor.

12. An image pickup apparatus according to claim 10, wherein the mirror is rotatable about an axis intersecting an optical axis of the taking lens.

13. An image pickup apparatus according to claim 12, wherein the mirror is disposed between the object and the taking lens.

14. An image pickup apparatus according to claim 12, wherein the mirror is disposed between the taking lens and the image sensor.

15. An image pickup apparatus according to claim 10, wherein the distance information generator further includes an angle setter which sets an angle between a surface of the object and a surface of the image sensor.

16. An image pickup apparatus according to claim 10 wherein said image pickup apparatus is a camera.

17. An image pickup apparatus comprising:

an image sensor;

a light image introducer which introduces respective light images of divided parts of an object part-by-part onto the image sensor, the light image introducer including a taking lens;

a distance information generator which generates distance information for each divided part of the object, the distance information generator including a distance detector which detects a distance to the object;

a lens driver which drives the taking lens based on generated distance information; and an image corrector which corrects output of the image sensor to eliminate an image distortion caused by an oblique image pickup, wherein the distance information generator further includes an angle setter which sets an angle between a surface of the object and a surface of the image sensor, wherein the distance detector detects distances to a plurality of points on the object, and the angle setter sets an angle based on detected distances to the plurality of points.

18. An image pickup apparatus comprising:

an image sensor;

a light image introducer which introduces respective light images of divided parts of an object part-by-part onto the image sensor, the light image introducer including a taking lens;

a distance information generator which generates distance information for each divided part of the object, the distance information generator including a distance detector which detects a distance to the object;

a lens driver which drives the taking lens based on generated distance information; and an image corrector which corrects output of the image sensor to eliminate an image distortion caused by an oblique image pickup, wherein the distance information generator further includes an angle setter which sets an angle between a surface of the object and a surface of the image sensor, wherein the distance information generator generates distance information based on a distance detected by the distance detector and an angle set by the angle setter.

19. An image pickup apparatus comprising:

a photosensitive member;

a light image introducer which introduces respective light images of divided parts of an object part-by-part onto the photosensitive member, the light image introducer including a taking lens and a rotatable mirror;

a distance information generator which generates distance information for each divided part of the object based on a distance to the object detected by a distance detector and a rotated position of the mirror; and a lens driver which drives the taking lens in synchronism with rotation of the mirror, based on generated distance information.

* * * * *